(12) United States Patent
Takeuchi

(10) Patent No.: US 9,824,274 B2
(45) Date of Patent: Nov. 21, 2017

(54) INFORMATION PROCESSING TO SIMULATE CROWD

(71) Applicant: SONY CORPORATION, Minato-ku (JP)

(72) Inventor: Yuichiro Takeuchi, Tokyo (JP)

(73) Assignee: SONY CORPORATION, Minato-ku (JP)

( * ) Notice: Subject to any disclaimer, the term of this patent is extended or adjusted under 35 U.S.C. 154(b) by 738 days.

(21) Appl. No.: 14/081,123

(22) Filed: Nov. 15, 2013

(65) Prior Publication Data

US 2014/0149094 A1    May 29, 2014

(30) Foreign Application Priority Data

Nov. 26, 2012 (JP) .................................. 2012-257248

(51) Int. Cl.
*G06G 7/48* (2006.01)
*G06K 9/00* (2006.01)

(52) U.S. Cl.
CPC ..... *G06K 9/00624* (2013.01); *G06K 9/00778* (2013.01)

(58) Field of Classification Search
CPC ............ G06F 17/5009; G06K 9/00778; G06K 9/00624
USPC ............................................................ 703/6
See application file for complete search history.

(56) References Cited

U.S. PATENT DOCUMENTS

| 8,208,943 | B2* | 6/2012 | Petersen | G06Q 10/10 455/453 |
| 8,554,770 | B2* | 10/2013 | Purdy | G06Q 30/0204 455/456.1 |
| 2010/0050004 | A1* | 2/2010 | Hamilton, II | G06F 1/3203 713/320 |
| 2014/0062790 | A1* | 3/2014 | Letz | H04L 67/1095 342/386 |

OTHER PUBLICATIONS

Patil et al. "Directing Crowd Simulations Using Navigation Fields". IEEE Feb. 2011., p. 244-254.*
Ulicny et al. "Towards Interactive Real-Time Crowd Behavior Simulaltion". Computer Graphics Forum, vol. 21 (2002), No. 4pp. 767-755.*
Pelechano et al. "Controlling Individual Agents in High-Density Crowd Simulation". Eurographics/ACM Sigggraph Symposium on Computer Animation (2007). 10 Pages.*
Musse et al. "Hierarchical Model for REal Time Simulaiton of Virtual Human Crowds". IEEE. 2001. p. 152-164.*
Fridman. "Modeling crowd behavior". Submitted to the Senate of Bar-Ilan University Ramat Gan, Israel. May 2012. 179 Pages.*
MDT "Pedestrian Flow Modeling for Prototypical Maryland Cities". Nov. 2004. 123 Pages.*

* cited by examiner

*Primary Examiner* — Eunhee Kim
(74) *Attorney, Agent, or Firm* — Chip Law Group

(57) ABSTRACT

There is provided an information processing apparatus including a simulation unit configured to perform simulation with respect to a crowd present in a target region in a real world, and to generate a simulation image that represents the crowd, a data collection unit configured to collect position associated data that is associated with geographical positions of one or more people, and a control unit configured to control the simulation based on the position associated data.

20 Claims, 24 Drawing Sheets

| | CM1 | CM2 | CM3 | CM4 |
|---|---|---|---|---|
| SEX: | MALE | MALE | FEMALE | MALE |
| AGE: | YOUNG | ELDERLY | YOUNG | CHILD |
| INCOME: | MIDDLE | HIGH | MIDDLE | — |

| | AGE | INCOME |
|---|---|---|
| VM1 | YOUNG | HIGH |
| VM2 | YOUNG | MIDDLE |

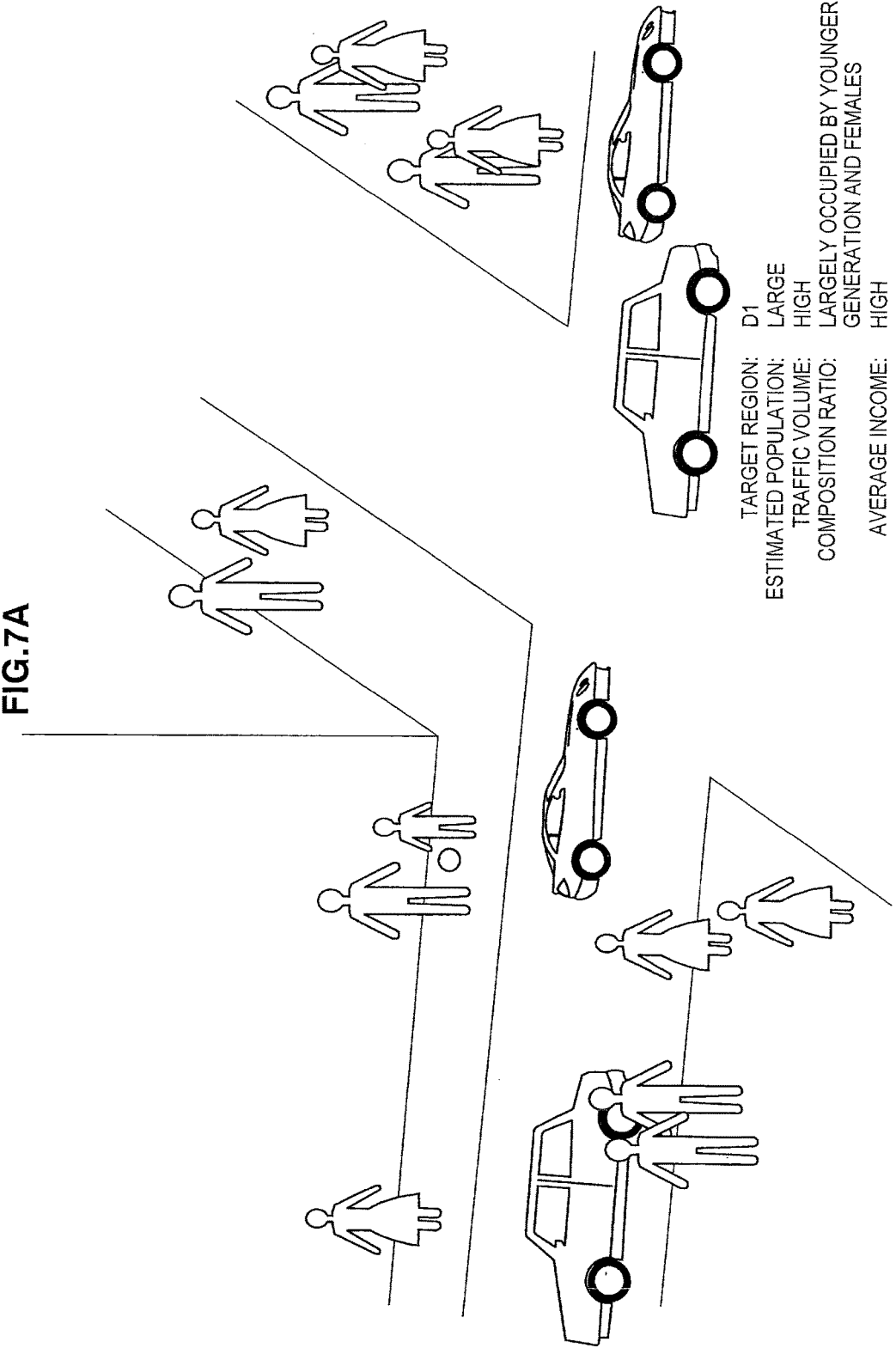

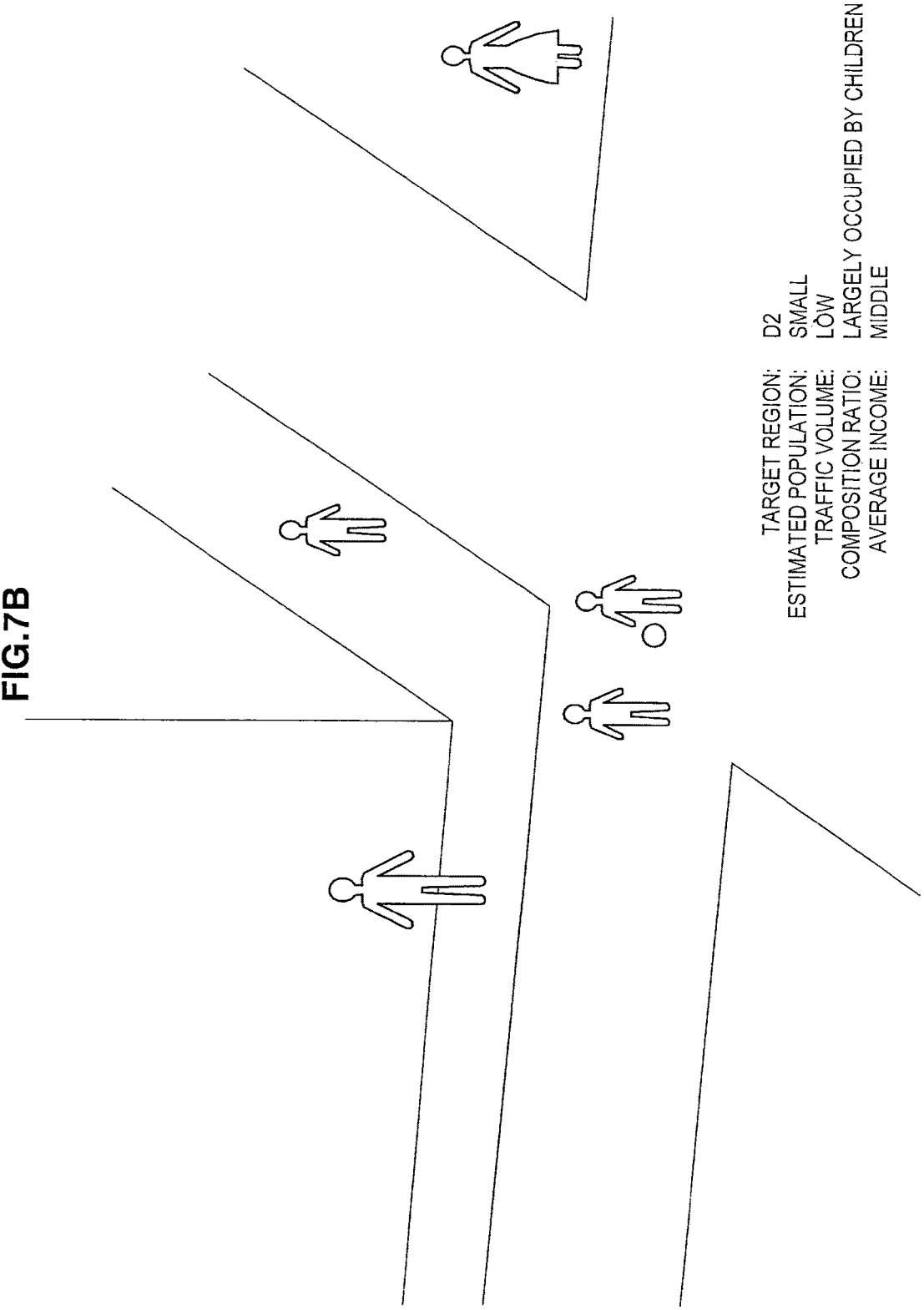

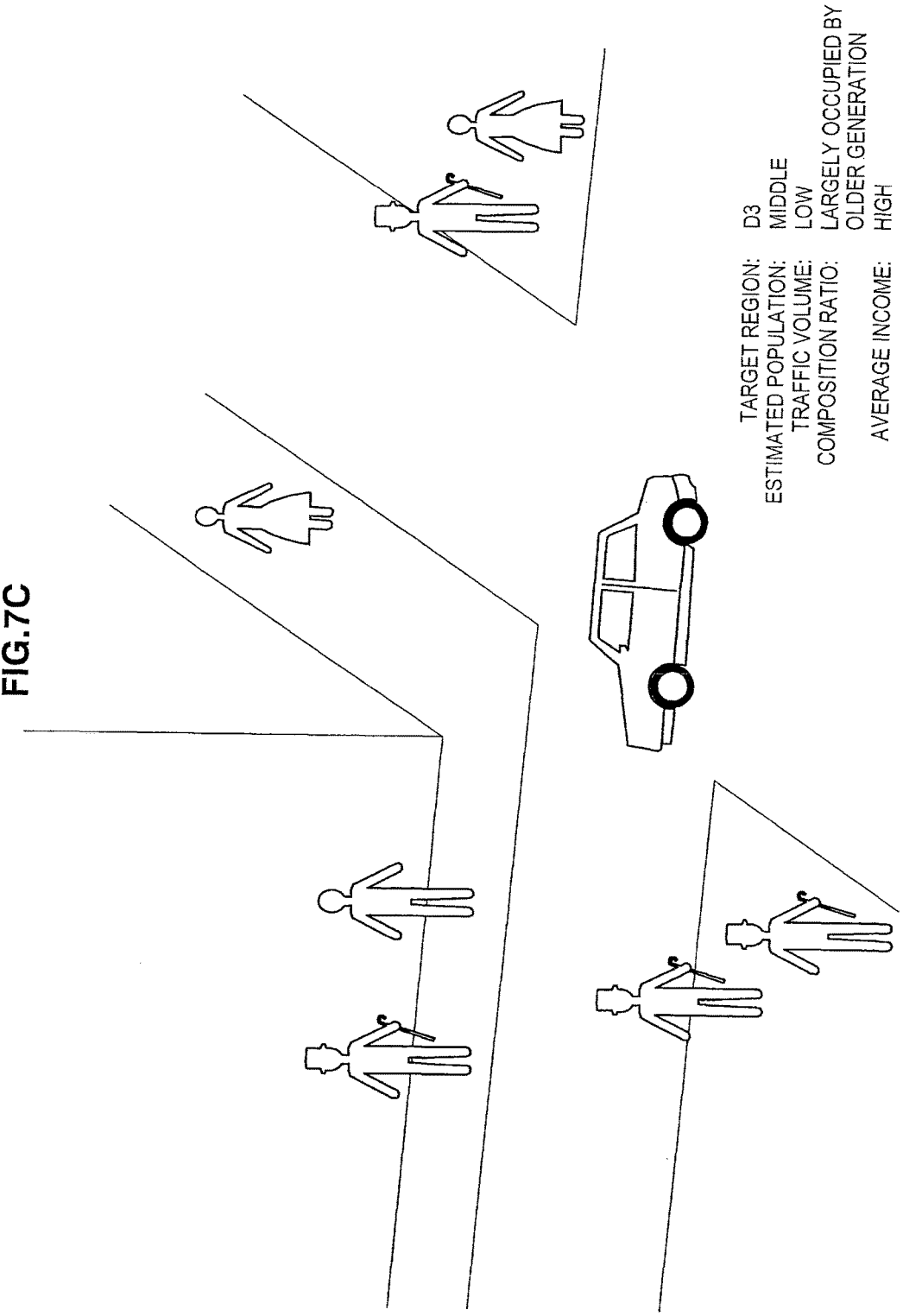

BEHAVIOR: TELEPHONE CONVERSATION    JOGGING    SMOKING

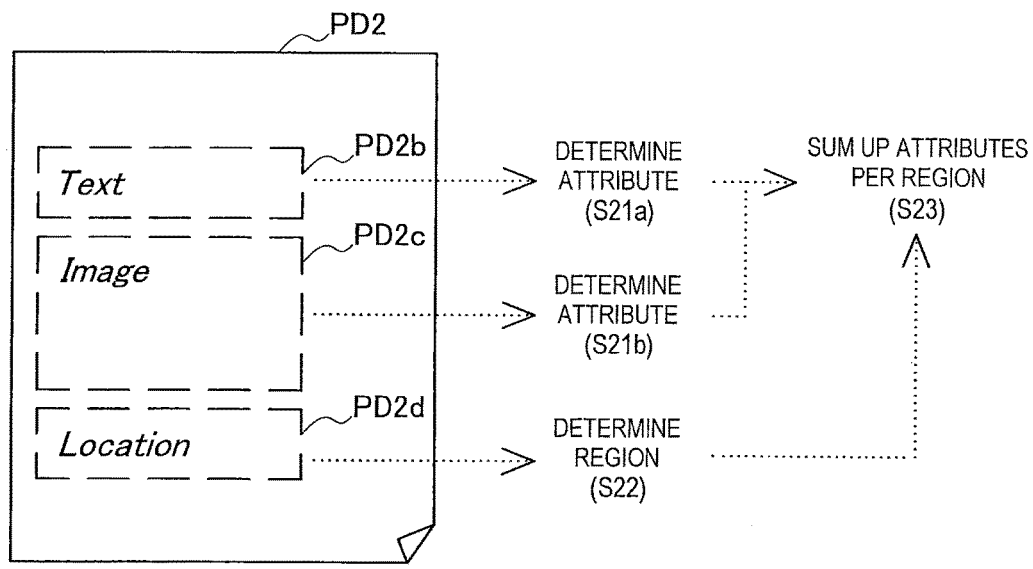
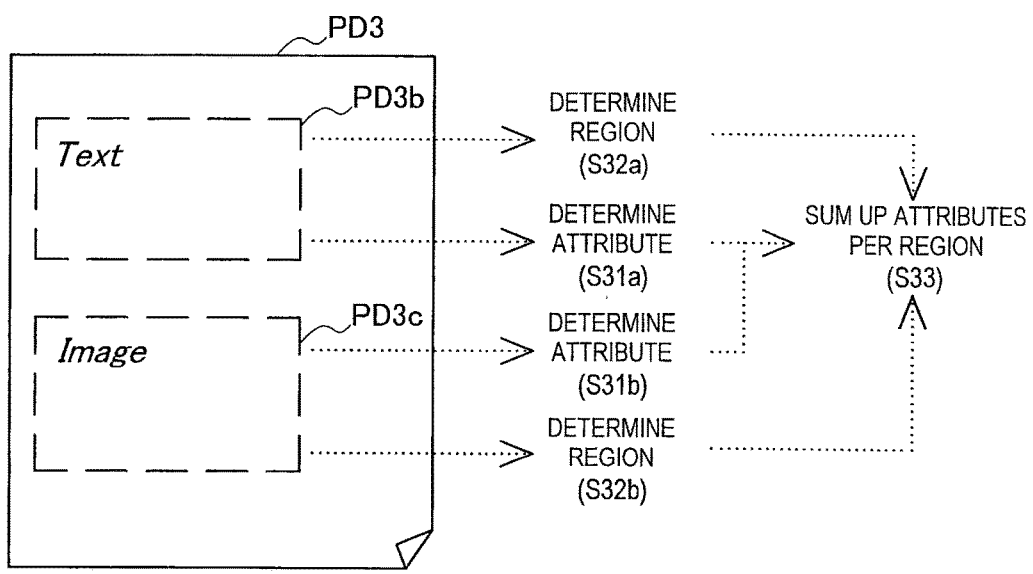

WEATHER: FINE

TIME ZONE: MORNING

WEATHER: CLOUDY

TIME ZONE: DAY

WEATHER: FINE

TIME ZONE: NIGHT

INFORMATION PROCESSING TO SIMULATE CROWD

CROSS REFERENCE TO RELATED APPLICATIONS

This application claims the benefit of Japanese Priority Patent Application JP 2012-257248 filed Nov. 26, 2012, the entire contents of which are incorporated herein by reference.

BACKGROUND

The present disclosure relates to an information processing apparatus, a terminal apparatus, an information processing method, and a program.

In recent years, various geographical information services that provide geographical information regarding the real world to a user on a computer screen have been implemented. For example, using general map retrieval services that available on the Web, users can grasp what types of buildings or roads arranged in the vicinity of a desired location, and how they arranged. Some services provide images actually shot at a location designated by a user on a map.

Maps provided to users in general map retrieval services are created in advance as static data (two-dimensional or three-dimensional model), and stored in databases. Accordingly, it is difficult to grasp a situation of a city from such maps because the city may change with the lapse of time. For example, a certain business city seems, on a map, to be a downtown with commercial building clustered therein. Although the city is certainly crowded with a lot of people on weekdays, the city may be visited by few people and vacant on holidays.

Ulrich Neumann, Suya You, Jinhui Hu, Bolan Jiang, and Ismail Oner Sebe, "Visualizing Reality in an Augmented Virtual Environment," University of Southern California propose a technique of dynamically updating a three-dimensional model by detecting a dynamic change (such as movement of a person or a vehicle) in the real world via a camera and another sensor, and applying the detected change to the static three-dimensional model. Ulrich Neumann, Suya You, Jinhui Hu, Bolan Jiang, and Ismail Oner Sebe, "Visualizing Reality in an Augmented Virtual Environment," University of Southern California specifically describes a system that is actually constructed by using a campus of a university as a model space.

SUMMARY

According to the technique described by Ulrich Neumann, Suya You, Jinhui Hu, Bolan Jiang, and Ismail Oner Sebe, "Visualizing Reality in an Augmented Virtual Environment," University of Southern California, it is certainly possible for a user to grasp a situation of the real world that may change with the lapse of time, by referring to a three-dimensional model that is dynamically updated. However, in view of costs and privacy protection, it is not practical to arrange a lot of cameras and other sensors in the real world in the case of a larger scale city.

Thus, there has not yet been provided any practical mechanism that enables a user to easily grasp a situation of a city which may change with the lapse of time.

According to an embodiment of the present disclosure, there is provided an information processing apparatus including a simulation unit configured to perform simulation with respect to a crowd present in a target region in a real world, and to generate a simulation image that represents the crowd, a data collection unit configured to collect position associated data that is associated with geographical positions of one or more people, and a control unit configured to control the simulation based on the position associated data.

According to another embodiment of the present disclosure, there is provided a terminal apparatus including a user interface unit configured to provide a user interface that allows a user to designate a target region in a real world, and a control unit configured to transmit the designated target region to a server apparatus that performs simulation with respect to a crowd present in the target region based on position associated data which is associated with geographical positions of one or more people, to receive, as a result of the simulation, a simulation image that represents the crowd, and to display the simulation image on a screen.

According to still another embodiment of the present disclosure, there is provided an information processing method executed by a terminal apparatus, the information processing method including providing a user interface that allows a user to designate a target region in a real world, transmitting the designated target region to a server apparatus that performs simulation with respect to a crowd present in the target region based on position associated data which is associated with geographical positions of one or more people, receiving, as a result of the simulation, a simulation image that represents the crowd, and displaying the simulation image on a screen.

According to still another embodiment of the present disclosure, there is provided a program for causing a computer that controls a terminal apparatus to function as a user interface unit configured to provide a user interface that allows a user to designate a target region in a real world, and a control unit configured to transmit the designated target region to a server apparatus that performs simulation with respect to a crowd present in the target region based on position associated data which is associated with geographical positions of one or more people, to receive, as a result of the simulation, a simulation image that represents the crowd, and to display the simulation image on a screen.

According to one or more of embodiments of the present disclosure, is becomes possible for a user to easily grasp a situation of a city which may change with the lapse of time.

BRIEF DESCRIPTION OF THE DRAWINGS

FIG. 7A is an explanatory diagram for describing a first example of a simulation result;

FIG. 7B is an explanatory diagram for describing a second example of a simulation result;

FIG. 7C is an explanatory diagram for describing a third example of a simulation result;

FIG. 11B is an explanatory diagram for describing a second analysis example of posting data;

FIG. 11C is an explanatory diagram for describing a third analysis example of posting data;

DETAILED DESCRIPTION OF THE EMBODIMENT(S)

Figure 1:
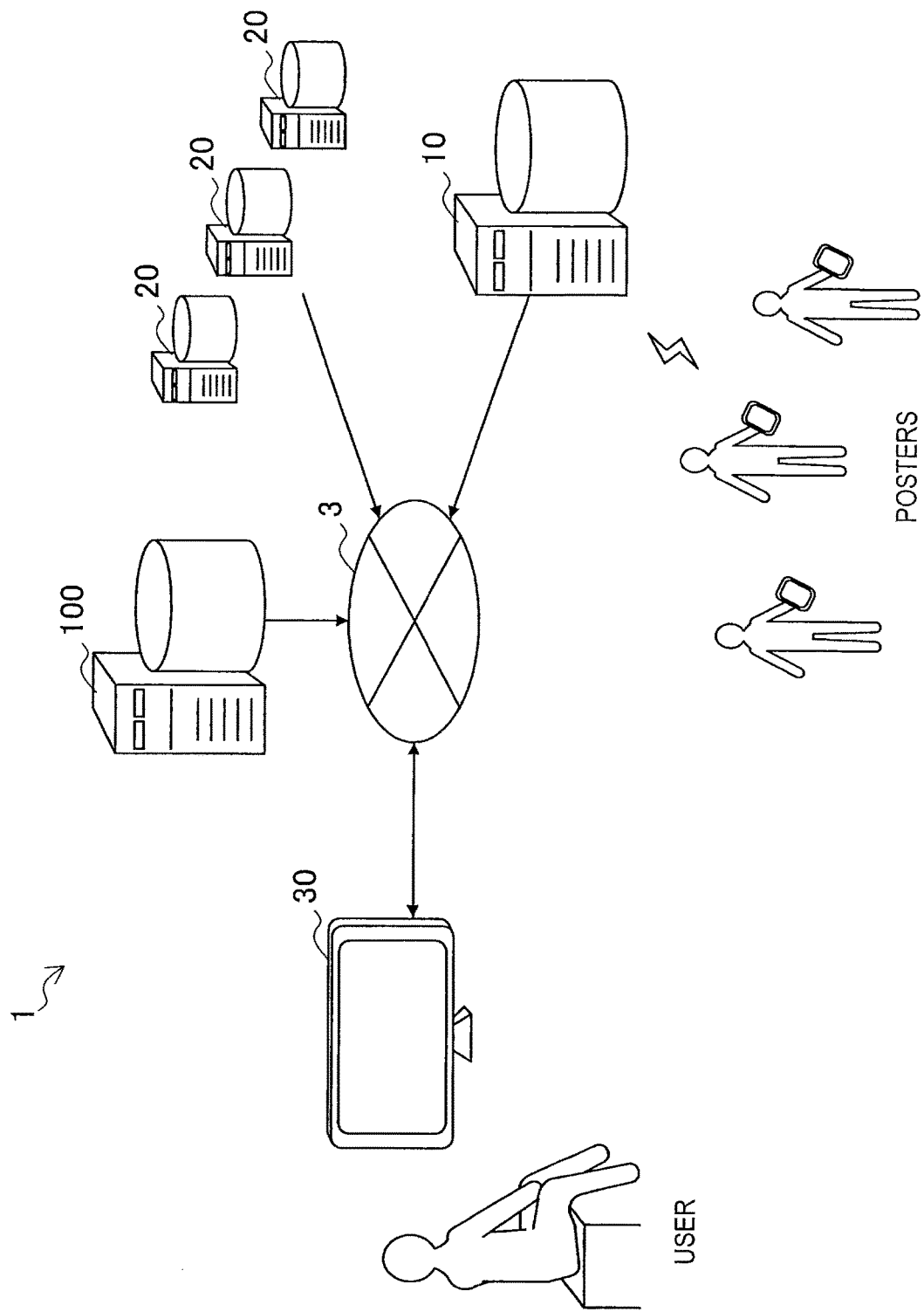
FIG. 1 is an explanatory diagram for describing an overview of an information processing system according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of System
2. Configuration of Apparatus according to Embodiment
2-1. Hardware Configuration Example
2-2. Functional Configuration Example
2-3. Details of Simulation
2-4. Decision of Simulation Parameter
2-5. Example of User Interface
2-6. Flow of Processes
2-7. Configuration Example of Terminal
3. Modified Examples
3-1. Overview
3-2. Functional Configuration Example
3-3. Example of User Interface
3-4. Further Modified Example
4. Conclusion <1. Overview of System>

First, by using FIG. 1, an overview of an information processing system according to an embodiment will be described. With reference to FIG. 1, an information processing system 1 is illustrated as an example. The information processing system 1 includes an information processing apparatus 100.

The information processing apparatus 100 performs simulation with respect to a crowd present in a target region in the real world. The simulation performed by the information processing apparatus 100 is used for virtually reproducing a situation of a city that may change with the lapse of time. The situation of the city may be reproduced, for example, by a scale, an attribute, or behavior of the crowd that may be at least partially displayed on a simulation image. In the simulation, the crowd may be represented by a collection of characters that may correspond to people. Instead thereof (or in addition thereto), the crowd may be represented by a collection of vehicles that the people are supposed to drive. The information processing apparatus 100 decides a simulation parameter on the basis of position associated data that may be collected from a data server 10 and an external server group 20. The information processing apparatus 100 performs simulation by using the decided simulation parameter with respect to a target region that may be designated by a user.

The information processing apparatus 100 is connected to the data server 10, the external server group 20, and a terminal apparatus 30 via a network 3. The network 3 may be a public network such as the Internet, or a private network such as a virtual private network (VPN).

The data server 10 is a server apparatus that accumulates pieces of posting data posted by a poster in a user posting type information transmission service. The user posting type information transmission service may include a social networking service (SNS) such as Facebook (registered trademark) and Foursquare (registered trademark), a short message posting service such as Twitter (registered trademark), and an image posting service such as Instagram. The data server 10 provides the accumulated pieces of posting data to the information processing apparatus 100. In view of privacy protection, identification information that identifies each poster may be deleted from the posting data when the positing data is provided. The information processing apparatus 100 may use the posting data provided by the data server 10 as position associated data in order to decide a simulation parameter.

The information transmission service used in the present embodiment may be a location-aware service in which posting data uploaded from a terminal of a poster entails position data, or may also be a service in which the posting data does not entail position data. In the latter case, the information processing apparatus 100 may determine a geographical position associated with the posting data by analyzing the posting data.

The external server group 20 includes one or more server apparatuses that provide data additionally used in simulation performed by the information processing apparatus 100. For example, the external server group 20 may provide the information processing apparatus 100 with statistical data collected with respect to one or more people on the basis of geographical positions. The statistical data may include, for example, traffic volume data, average income data, and peace data. The external server group 20 may provide the information processing apparatus 100 with weather data indicating the weather for each geographical region.

The terminal apparatus 30 displays a simulation image that is output from the information processing apparatus 100 as a result of simulation. The terminal apparatus 30 may be an information processing terminal such as a personal computer (PC), a smartphone, a personal digital assistant (PDA), and a game terminal, a digital home electric appliance such as a television apparatus and a digital photo frame, or a simple monitor. The terminal apparatus 30 may be connected to the information processing apparatus 100 without going through the network 3. A display device of the information processing apparatus 100 may also substitute for the terminal apparatus 30.

<2. Configuration of Apparatus According to Embodiment>

(2-1. Hardware Configuration Example)

Figure 2:
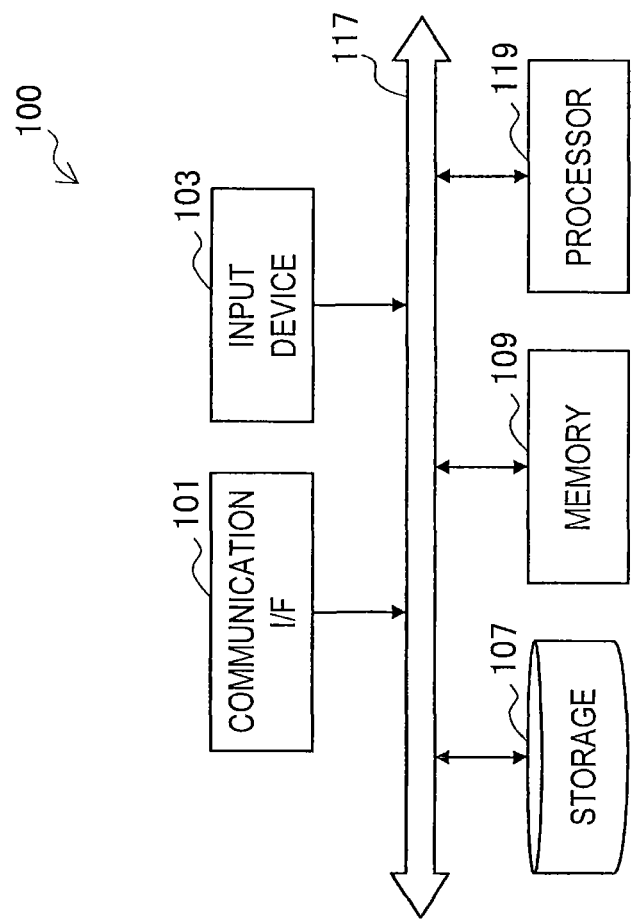
FIG. 2 is a block diagram illustrating a hardware configuration example of an information processing apparatus according to an embodiment.

FIG. 2 is a block diagram illustrating a hardware configuration example of the information processing apparatus 100. With reference to FIG. 2, the information processing apparatus 100 includes a communication interface (I/F) 101, an input device 103, a storage 107, a memory 109, a bus 117, and a processor 119.

(1) Communication Interface

The communication I/F 101 supports a given wireless communication protocol or wired communication protocol. In the present embodiment, the communication I/F 101 establishes communication connection among the information processing apparatus 100, the data server 10, the external server group 20, and the terminal apparatus 30.

(2) Input Device

The input device 103 is used for an operator of the information processing apparatus 100 to operate the information processing apparatus 100. The input device 103 may include, for example, a keyboard and a pointing device.

(3) Storage

The storage 107 includes a mass storage medium such as a hard disk, and stores various types of data in a database of the information processing apparatus 100. In the present embodiment, the storage 107 has two databases (DBs), a parameter database and a model database, constructed therein, which will be described below.

(4) Memory

The memory 109 may be a semiconductor memory that may include random access memory (RAM) and read only memory (ROM), and stores a program and data for a process performed by the information processing apparatus 100. The program is stored in advance, for example, in a storage medium (non-transitory medium) that is provided inside or outside each device, read into the RANI upon execution, and executed by the processor 119.

(5) Bus

The bus 117 connects the communication I/F 101, the input device 103, the storage 107, the memory 109, and the processor 119 to each other.

(6) Processor

The processor 119 may be, for example, a central processing unit (CPU) or a digital signal processor (DSP). The processor 119 executes a program stored in the memory 109 or another storage medium to operate various functions of the information processing apparatus 100, which will be described below.

(2-2. Functional Configuration Example)

Figure 3:
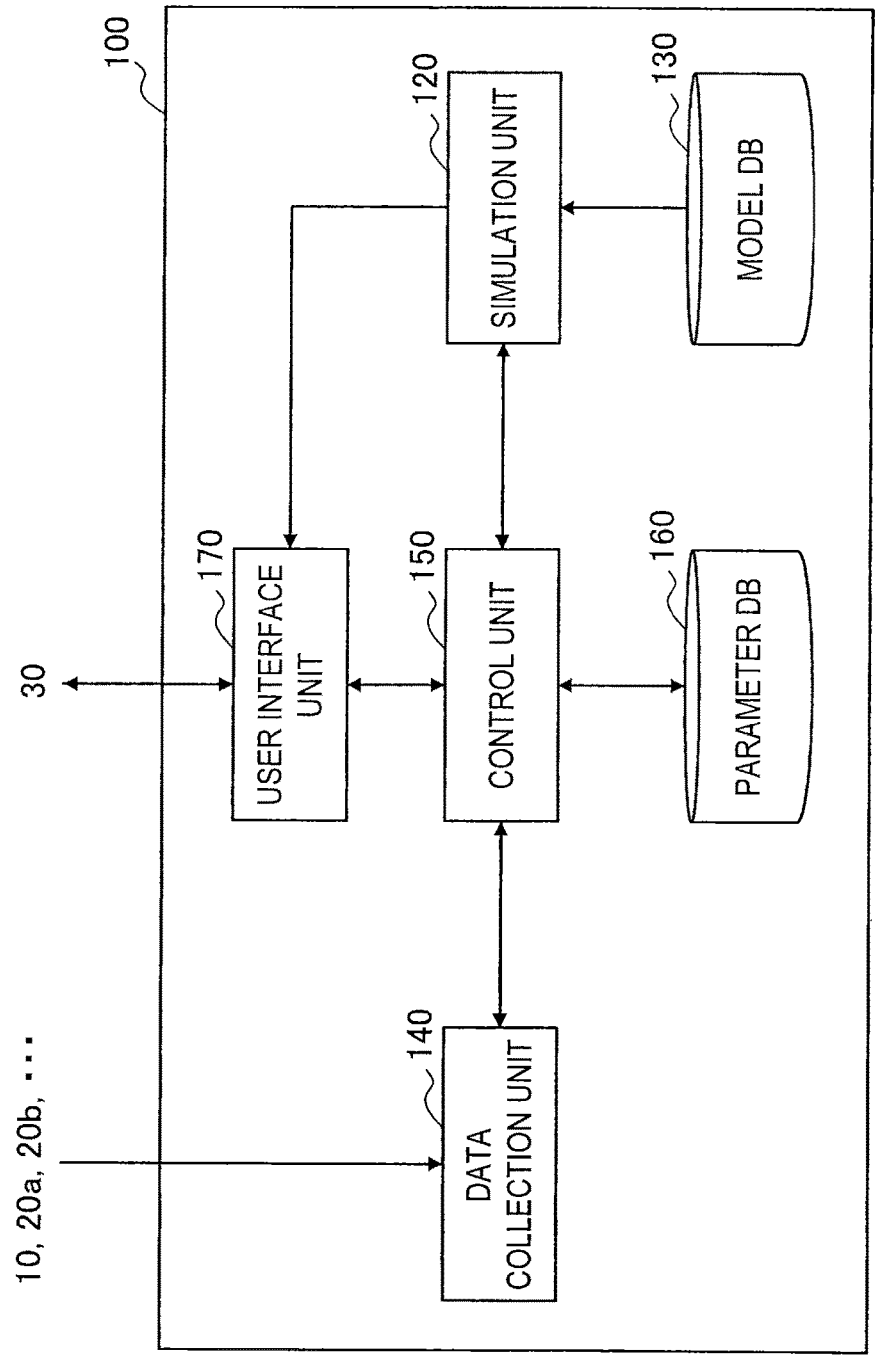
FIG. 3 is a block diagram illustrating a logical functional configuration example of an information processing apparatus according to an embodiment.

FIG. 3 is a block diagram illustrating an example of a logical function configuration that is realized by the storage 107, the memory 109, and the processor 119 of the information processing apparatus 100, which have been illustrated in FIG. 2. With reference to FIG. 3, the information processing apparatus 100 includes a simulation unit 120, a model DB 130, a data collection unit 140, a control unit 150, a parameter DB 160, and a user interface unit 170.

(1) Simulation Unit

The simulation unit 120 performs simulation for reproducing a situation of a city in the real world. The simulation unit 120 generates a simulation image that may include a crowd image. A scale, an attribute, and behavior of a crowd are decided for each geographical region by the control unit 150 on the basis of position associated data, which will be described below. The simulation unit 120 generates a simulation image of a target region designated by a user, and outputs the generated simulation image to the user interface unit 170.

(2) Model DB

The model DB 130 stores, in advance, model data that is used when the simulation unit 120 performs simulation. The model data stored by the model DB 130 may include a real world model, a character model, and a vehicle model, which will be described below. The real world model is a model (or a map) that imitates the landform and the arrangement of roads and buildings in the real world. The real world model may also be three-dimensional or two-dimensional. The character model imitates a person included in a crowd. The vehicle model imitates a vehicle included in the crowd. In simulation, the character model and the vehicle model are arranged in a model space represented by the real world model, and driven, for example, by artificial intelligence (AI) per element to move.

(3) Data Collection Unit

The data collection unit 140 collects position associated data that is associated with geographical positions of one or more people. For example, the position associated data may include posting data that is collected from the data server 10. The position associated data may also include statistical data that is collected from the external server group 20. For example, the data collection unit 140 periodically collects position associated data, and outputs the collected position associated data to the control unit 150.

(4) Control Unit

The control unit 150 controls simulation performed by the simulation unit 120. For example, the control unit 150 decides a simulation parameter with respect to one or more geographical regions that are set in the real world, on the basis of the position associated data collected by the data collection unit 140. The control unit 150 inputs a simulation parameter corresponding to a target region, which is designated through the user interface unit 170, to the simulation unit 120, and causes the simulation unit 120 to perform simulation with respect to a crowd present in the target region.

The simulation parameter decided by the control unit 150 may include a scale, an attribute, and behavior of a crowd for each geographical region. The scale of a crowd means the number of characters (population) arranged in the target region or the number of vehicles (traffic volume) arranged in target region in simulation. The attribute of a crowd influences types of characters arranged in the target region or types of vehicles arranged in the target region in simulation. For example, the attribute of a crowd may include an age composition ratio and a sex composition ratio. More characters representing young people or children may be arranged in a region in which a lot of people in a younger generation are present. To the contrary, more female characters may be arranged in a region in which a lot of females are present. The attribute of a crowd may include another parameter such as an average income and a peace level. The behavior of a crowd influences movement of a character and a vehicle arranged in the target region in simulation. For example, the behavior of a crowd is decided by modeling behavior of a person who is positioned in the target region in the real world or is in action regarding the target region.

The simulation parameter may further include, for example, the weather and a time zone for each target region, and an event that occurs in the target region. A part of the simulation parameters described herein may be omitted. An additional simulation parameter may also be adopted. It will be described below in more detail what types of simulation parameters the control unit 150 may decide on the basis of what types of position associated data.

(5) Parameter DB

The parameter DB 160 stores, for each geographical region, the simulation parameter decided by the control unit 150. The simulation parameter stored by the parameter DB 160 may be updated each time the data collection unit 140 collects new position associated data. The simulation parameter is read out from the parameter DB 160 when the simulation unit 120 performs simulation.

(6) User Interface Unit

The user interface unit 170 provides a user interface that allows a user to operate simulation performed in the information processing apparatus 100. For example, the user interface unit 170 generates a graphical user interface (GUI) for allowing a user to designate a target region, and causes the terminal apparatus 30 to display the generated GUI. The user interface unit 170 also causes the terminal apparatus 30 to display a simulation image generated by the simulation unit 120. The user interface unit 170 may superimpose a GUI object on the simulation image. For example, the user interface 170 may superimpose, on the simulation image, a GUI object for allowing a user to issue an instruction to switch views of the simulation image. Several examples of the user interfaces provided by the user interface unit 170 will be further described below.

(2-3. Details of Simulation)

Next, by using FIGS. 4 to 9, simulation that may be performed by the simulation unit 120 will be described in detail.

(1) Example of Model Data

Figure 4:
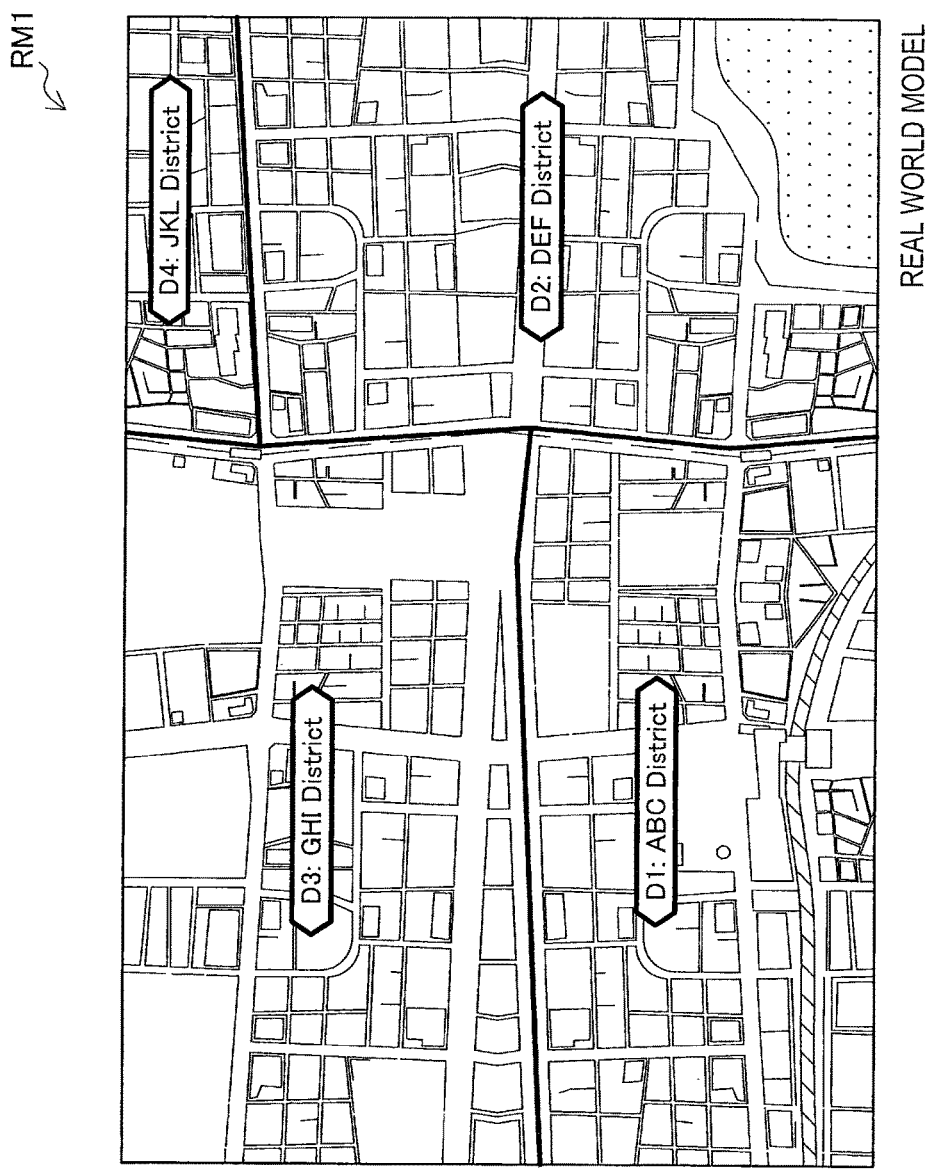
FIG. 4 is an explanatory diagram for describing an example of a real world model.

FIG. 4 partially illustrates, as an example, a real world model RM1 that may be stored by the model DB 130. Here, the real world model RM1 is represented from a viewpoint of the sky in a two-dimensional manner. However, in fact, the real world model RM1 may (or may not) represent, for example, height of a building and relief of land in a three-dimensional manner. In the example of FIG. 4, four geographical regions D1 to D4 are set in the real world model RM1. The geographical regions may be set on the basis of a given criterion according to a system object, such as being divided for each administrative district or nearest station. The larger the area of each region becomes, the greater a population parameter of position associated data becomes. Accordingly, a risk that a simulation parameter is not appropriately decided may be suppressed. However, if the area of each region is too large, characteristics of crowds in the respective regions are averaged. Consequently, a difference among the regions is likely to be indistinct. Additionally, a geographical region in which simulation can be performed may be set to only a partial region of the real world (such as a region around a major station).

Figure 5:
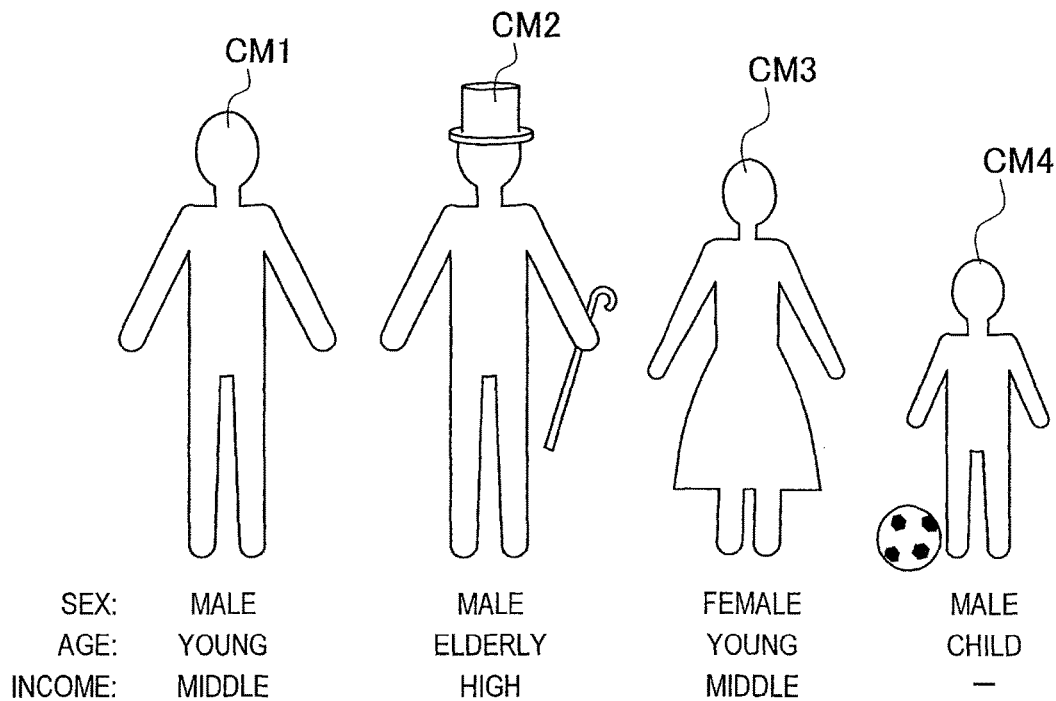
FIG. 5 is an explanatory diagram for describing examples of character models.

FIG. 5 illustrates four example character models CM1 to CM4 that may be stored by the model DB 130. The character models CM1 to CM4 are characterized by different attributes, and have outer appearances according to the characteristics. In FIG. 5, "sex," "age," and "income" are shown as examples of the attributes. For example, the character model CM1 represents a young male who earns a middle income and is ordinary in appearance. The character model CM2 represents an elderly male who earns a high income and is rich in appearance. The character model CM3 represents a young female who earns a middle income and is ordinary in appearance. The character model CM4 represents a male child who is boyish in appearance.

Figure 6:
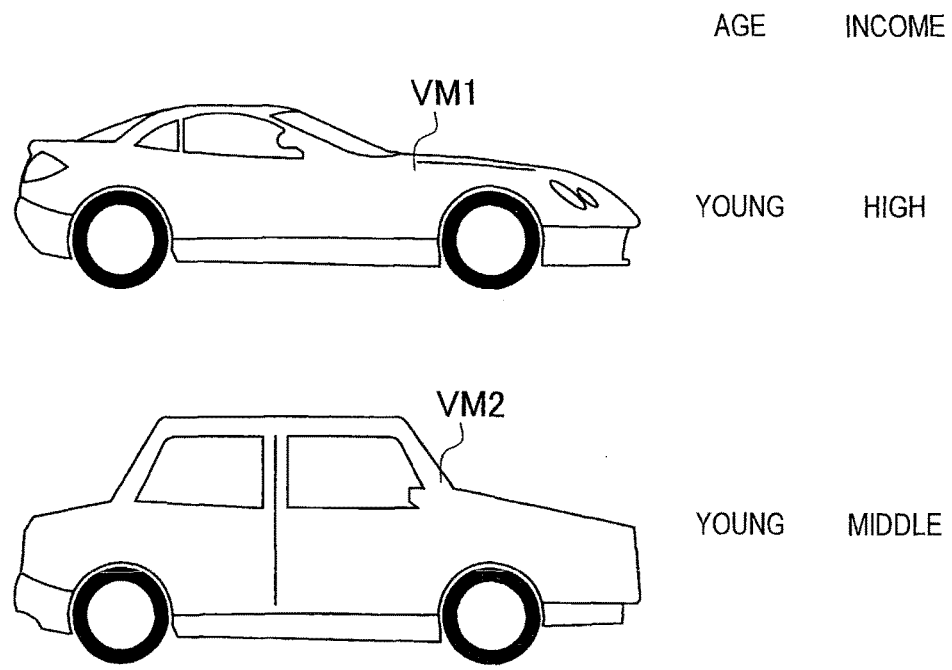
FIG. 6 is an explanatory diagram for describing examples of vehicle models.

FIG. 6 illustrates two example vehicle models VM1 and VM2 that may be stored by the model DB 130. The vehicle models VM1 and VM2 are characterized by different attributes, and have outer appearances according to the characteristics. In FIG. 6, "age" and "income" are shown as examples of the attributes. For example, the vehicle model VM1 represents a car such as a sports car that a young person having a high income drives. The vehicle model VM2 represents a car such as an economy car that a young person having a middle income drives.

(2) Examples of Simulation Results

The simulation unit 120 arranges a character model and a vehicle model in the real world model in accordance with a simulation parameter decided by the control unit 150 for each geographical region. The number of arranged character models depends on the estimated population in each region, which is decided by the control unit 150. Here, the estimated population does not have to approximate the true population of the real world. The object would be sufficiently achieved as far as the estimated value reflects a population difference between regions or a temporal change in population in the same region. The same applies to another simulation parameter. The number of arranged vehicle models may depend on a traffic volume decided by the control unit 150 or the estimated population. The types of arranged character models and the types of arranged vehicle models depend on an attribute of a crowd in each region, which is decided by the control unit 150.

FIG. 7A is an explanatory diagram for describing a first example of a simulation result. In the first example, a target region is a region D1. The estimated population of the target region D1 is larger and has a higher traffic volume than the other regions. The younger generation accounts for a large part of the age composition ratio of the target region D1, and females account for the larger part of the sex composition ratio of the target region D1. The average income of the target region D1 is higher than the other areas. The simulation result shows that very many characters come and go on the street, and a lot of cars are driven on the road in a model space of the target region D1. Female characters account for the relatively large part of the characters in the model space. Half of the cars are expensive sports cars.

FIG. 7B is an explanatory diagram for describing a second example of a simulation result. In the second example, a target region is a region D2. The estimated population of the target region D2 is smaller and has a lower traffic volume than the other regions. Children account for a large part of the age composition ratio of the target region D2. The average income of the target region D2 is middle. The simulation result shows that a few characters including multiple children are present on the street in a model space of the target region D2.

FIG. 7C is an explanatory diagram for describing a third example of a simulation result. In the third example, a target region is a region D3. The estimated population of the target region D3 is middle and has a low traffic volume. The older generation accounts for a large part of the age composition ratio of the target region D3. The average income of the target region D3 is higher than the other region. The simulation result shows that characters less than the first example and more than the second example come and go on the street, and one car is driven on the road in a model space of the target region D3. Elderly characters that are rich in appearance accounts for a relatively large part of the characters in the model space.

Comparison of the three examples illustrated in FIGS. 7A to 7C shows that differences among scales and attributes of the crowds present therein represent the characteristics of the cities. Such simulation can also be performed by using statistical data that is generally available. However, a situation of a city in the real world depends on a time zone, a day of the week, a season, any event, or the like so that the situation may change much with the lapse of time. Thus, static statistical data based on the past statistical period is not said to represent the latest situation of the city. Accordingly, as described above, the information processing apparatus 100 continuously collects position associated data, and dynamically changes a simulation parameter on the basis of the collected position associated data.

(3) Examples of Behavior of Crowd

Figure 8:
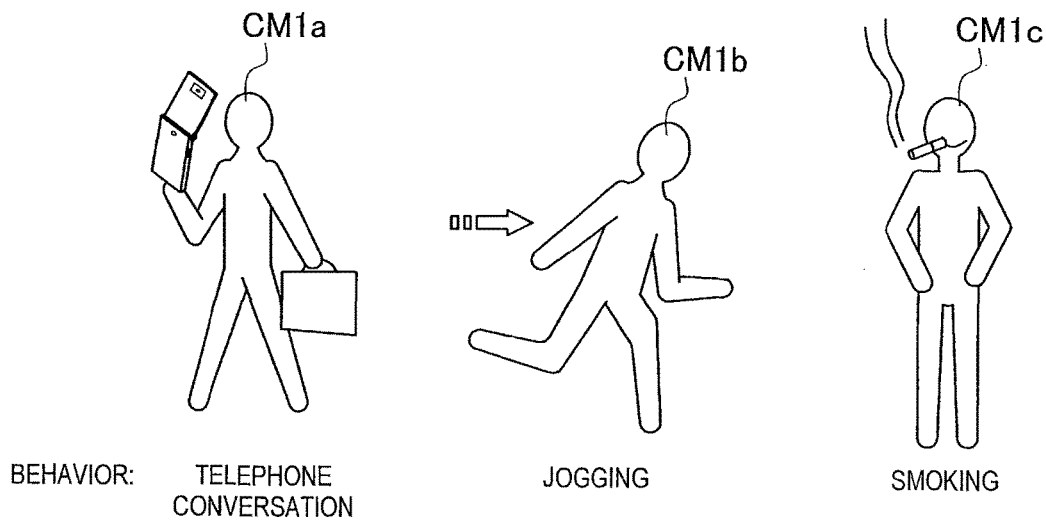
FIG. 8 is an explanatory diagram for describing examples of behavior of character models.

FIGS. 7A to 7C chiefly describe differences among scales and attributes of the crowds. However, the simulation unit 120 may cause a crowd in a model space to reproduce behavior of people modeled for each region. FIG. 8 is an explanatory diagram for describing examples of behavior of characters models. With reference to FIG. 8, a character model CM1a has a business bag in the left hand, and operates a mobile phone with the right hand. Such behavior called "telephone conversation" may be played by a character model arranged in a region having a lot of business people. A character model CM1b is "jogging." A character model CM1c is "smoking." Such kinds of behavior may also be modeled for each region, and played by character models.

(4) Example of Event

Figure 9:
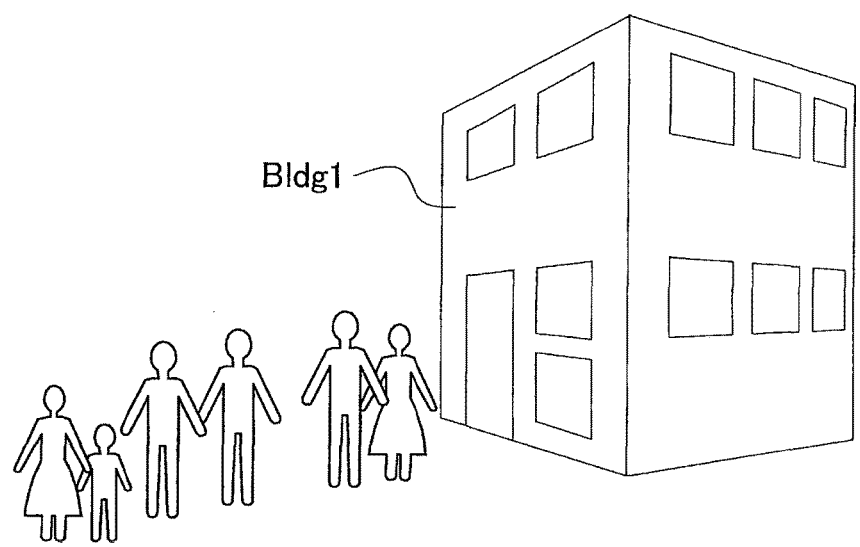
FIG. 9 is an explanatory diagram for describing an example of an event.

The simulation unit 120 may reproduce an event that occurs or an event that is predicted to occur in a certain geographical region, in simulation. FIG. 9 is an explanatory diagram for describing an example of an event that may be reproduced in simulation. With reference to FIG. 9, a building Bldg1 in a model space is illustrated. In certain simulation, a line is formed in front of the building Bldg1. For example, when a lot of posting data associated with a shop in a certain place are collected in a short time, it is determined that an event, "line," occurs. The determined event may be reproduced in simulation. The simulation unit 120 may reproduce another type of events such as "occurrence of a traffic accident" and "flowering of cherry blossoms."

(2-4. Decision of Simulation Parameter)

(1) Technique Based on Posting Data of Information Transmission Service

It is important to appropriately decide a simulation parameter in order to acquire a useful simulation result. In the present embodiment, the control unit 150 decides a simulation parameter on the basis of positing data collected from the data server 10. A poster actively posts various actions or events in the real world to an information transmission service. Posting is performed in real time or with just a few time lags in most cases. Thus, a simulation parameter is decided from the posting data of the information transmission service so that it is possible to track a situation of a city that may change with the lapse of time, with few time lags.

Figure 10:
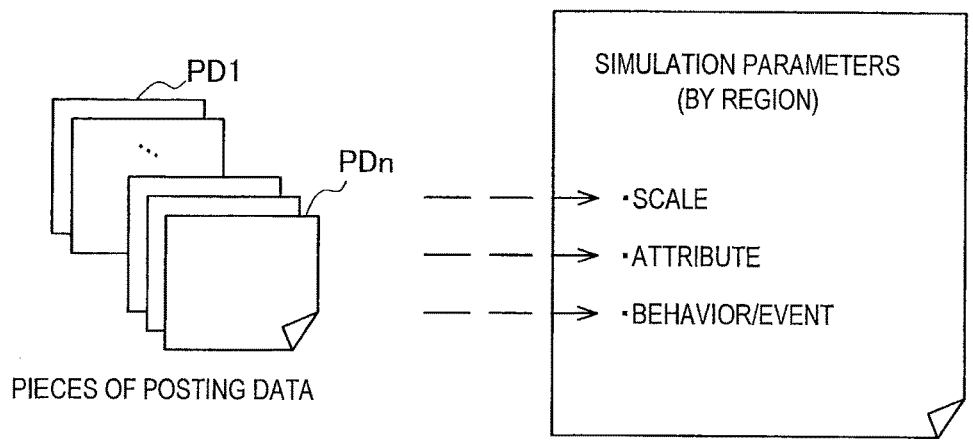
FIG. 10 is an explanatory diagram for describing a first technique for deciding a simulation parameter.

FIG. 10 is an explanatory diagram for describing a first technique for deciding a simulation parameter. The left of FIG. 10 illustrates pieces of posting data PD1 to PDn that are collected by the data collection unit 140 within a fixed time frame. The control unit 150 estimates the number of people and attributes of people corresponding to each geographical region, by analyzing the pieces of data PD1 to PDn, and decides a scale and an attribute of a crowd in each geographical region in accordance with the estimation result. The term, "corresponding to each geographical region," may herein mean not only that people are positioned in each geographical region, but also that people are in action regarding each geographical region (such as "searching for a new house in ABC district" and discussing "ABC district"). Furthermore, the control unit 150 may determine behavior of people corresponding to each geographical region, and an event that may occur in each geographical region, by analyzing the pieces of posting data PD1 to PDn.

Figure 11A:
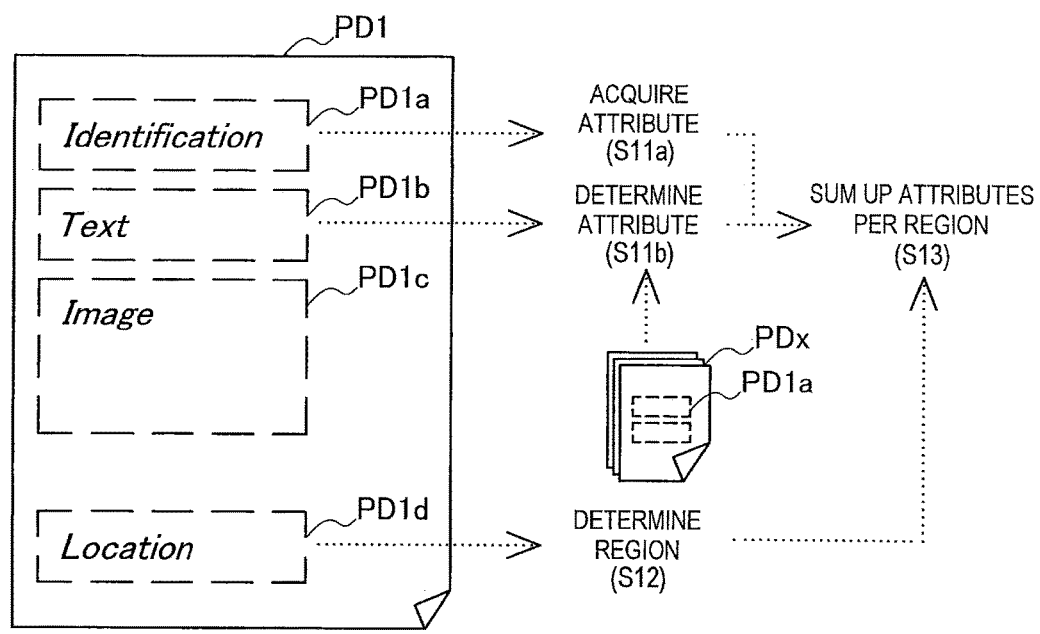
FIG. 11A is an explanatory diagram for describing a first analysis example of posting data.

FIG. 11A is an explanatory diagram for describing a first analysis example of posting data. In the first example, the posting data PD1 includes user identification information PD1a, text PD1b, an image PD1c, and position data PD1d.

The control unit 150 may use, for example, the user identification information PD1a to acquire an attribute (registered in the information transmission service) of a poster of the posting data PD1 from the data server 10 (step S11a). Instead, the control unit 150 applies the known natural language analyzing technology to the text PD1b to extract a keyword or a key phrase from the text PD1b, and determine the attribute of the poster of the posting data PD1 from the extracted keyword or key phrase (step S11b). For example, a key phrase, "going to university," may be used to determine that the poster is a young person who is about twenty years old. A key phrase, "wanting a girlfriend," may also be used to determine that the poster is a male. The attribute of the poster of the positing data PD1 may be determined on the basis of text or an image included in not the posting data PD1, but previous posting data PDx that includes the same user identification information PD1a as the posting data PD1.

In the first example of FIG. 11A, the position data PD1d indicates a geographical position of the poster at the time when the posting data PD1 is uploaded. Thus, the control unit 150 may determine a geographical region corresponding to the posting data PD1 by using the position data PD (step S12). Furthermore, the control unit 150 can estimate a scale of a crowd for each geographical region by summing up, over multiple pieces of posting data, the number of pieces of posting data for each geographical region. The control unit 150 may also estimate an attribute of a crowd for each geographical region by summing up, over multiple pieces of posting data, attributes that are determined from the pieces of posting data for each geographical region (step S13).

FIG. 11B is an explanatory diagram for describing a second analysis example of posting data. In the second example, posting data PD2 includes text PD2b, an image PD2c, and position data Pd2d. User identification information is deleted from the posting data PD2 for privacy protection.

The control unit 150 may determine an attribute of a poster of the posting data PD2, for example, on the basis of a keyword or a key phrase extracted from the text PD2b (step S21a). The control unit 150 may determine an attribute (such as sex or age) of the poster of the posting data PD2 or a subject shown in the image PD2c by applying the known image recognition technology to the image PD2c (step S21b).

In the second example of FIG. 11B, the position data PD2d indicates a geographical position of the poster at the time when the posting data PD2 is uploaded. Thus, the control unit 150 may determine a geographical region corresponding to the posting data PD2 by using the position data PD2d (step S22). Furthermore, the control unit 150 can estimate a scale of a crowd for each geographical region by summing up, over multiple pieces of posting data, the number of pieces of posting data for each geographical region. The control unit 150 may also estimate an attribute of a crowd for each geographical region by summing up, over multiple pieces of posting data, attributes that are determined from the pieces of posting data for each geographical region (step S23).

FIG. 11C is an explanatory diagram for describing a third analysis example of posting data. In the third example, posting data PD3 includes text PD3b and an image PD3c.

The control unit 150 may determine an attribute of a poster of the posting data PD3, for example, on the basis of a keyword or a key phrase extracted from the text PD3b (step S31a). The control unit 150 may determine an attribute of the poster of the posting data PD3 or a subject shown in the image PD3c by applying the known image recognition technology to the image PD3c (step S31b).

In the third example, the posting data PD3 does not include position data. Accordingly, the control unit 150 may determine a geographical region corresponding to the posting data PD3, for example, on the basis of a keyword or a key phrase extracted from the text PD3b (step S32a). For example, a geographical region may be determined from a name of a place indicated by the keyword. Alternatively, a name of a building may be used to determine a geographical region of the address of the building. Instead, the control unit 150 may determine a geographical region corresponding to the posting data PD3 by comparing the image PD3c with known images of various landmarks (step S32b).

Furthermore, the control unit 150 can estimate a scale of a crowd for each geographical region by summing up, over multiple pieces of posting data, the number of pieces of posting data for each geographical region. The control unit 150 can also estimate an attribute of a crowd for each geographical region by summing up, over multiple pieces of posting data, attributes that are determined from the pieces of posting data for each geographical region (step S33).

Figure 11D:
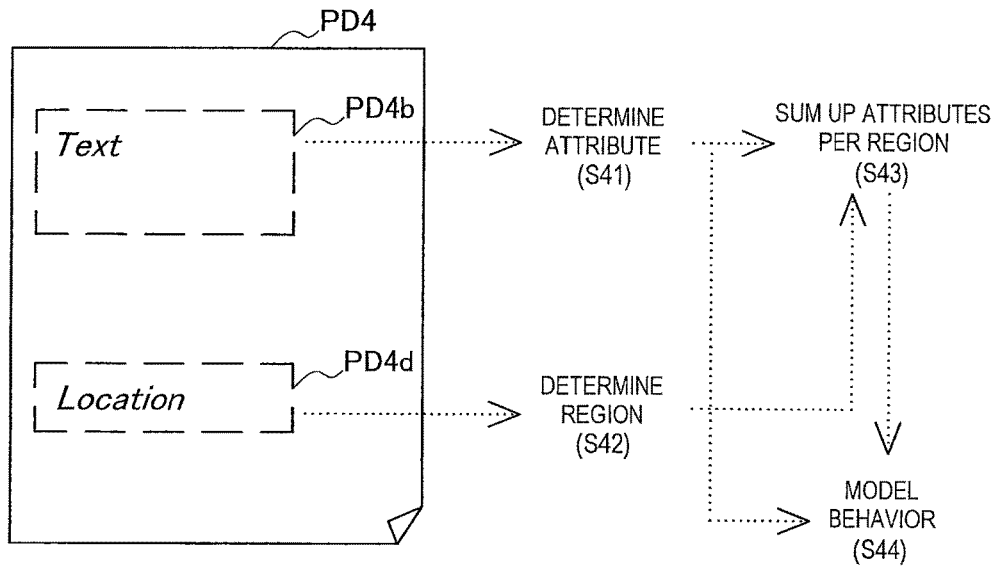
FIG. 11D is an explanatory diagram for describing a fourth analysis example of posting data.

Posting data may be analyzed not only for estimating a scale and an attribute of a crowd for each geographical region, but also for modeling behavior of the crowd. FIG. 11D is an explanatory diagram for describing a fourth analysis example of posting data. In the fourth example, posting data PD4 includes text PD4b and position data PD4d.

The control unit 150 may determine an attribute of a poster of the posting data PD4, for example, on the basis of a keyword or a key phrase extracted from the text PD4b (step S41). The control unit 150 may determine a geographical region corresponding to the posting data PD4 by using the position data PD4d (step S42). Furthermore, the control unit 150 can also estimate a scale and an attribute of a crowd for each geographical region by summing up, over multiple pieces of posting data, the number of pieces of posting data and an attribute for each geographical region (step S43).

In the fourth example, the control unit 150 further models behavior of a crowd for each geographical region on the basis of the attribute (or summed attributes of crowds) of the poster of the posting data PD4 determined by using the text PD4b (step S44). For example, if it is determined from the text PD4b that the poster of the posting data PD4 is a business person, one of character models included in a crowd in a geographical region corresponding to the posting data PD4 may play the behavior, "telephone conversation," illustrated in FIG. 8. In addition, if an attribute of a crowd in a certain geographical region indicates that the crowd includes a lot of young people, some of the character models included in the crowd may play the behavior, "jogging," illustrated in FIG. 8. Additionally, an image or user identification information may be used instead of text included in posting data in order to model behavior of a crowd.

Figure 11E:
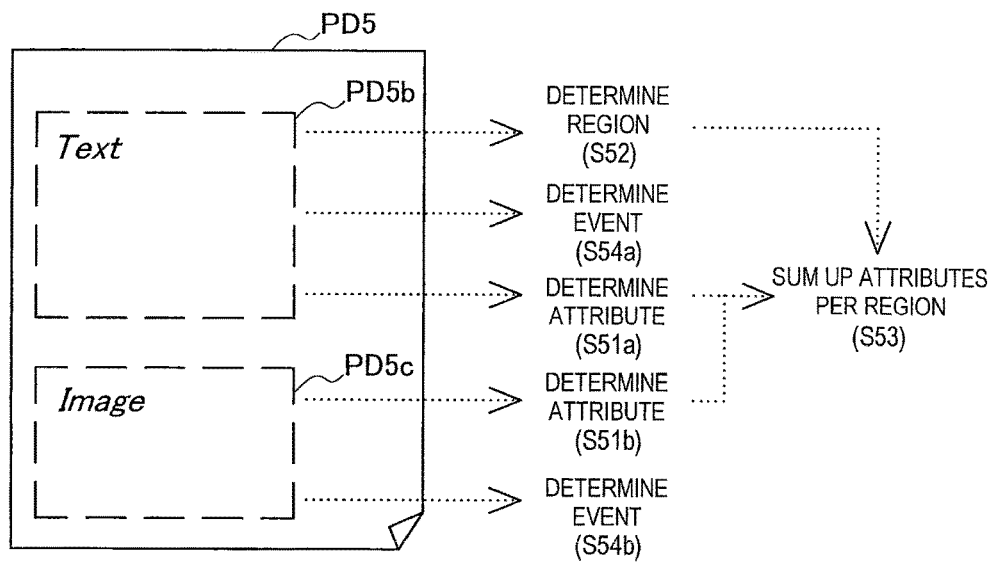
FIG. 11E is an explanatory diagram for describing a fifth analysis example of posting data.

Posting data may be analyzed in order to determine an event that occurs or an event that is predicted to occur in a target region. FIG. 11E is an explanatory diagram for describing a fifth analysis example of posting data. In the fifth example, posting data PD5 includes text PD5b and an image PD5c.

The control unit 150 may determine an attribute of a poster of the posting data PD5, for example, on the basis of a keyword or a key phrase extracted from the text PD5b (step S51a). The control unit 150 may determine an attribute of the poster of the posting data PD5 or a subject shown in the image PD5c by applying the known image recognition technology to the image PD5c (step S51b). The control unit 150 may also determine a geographical region corresponding to the posting data PD5 on the basis of a keyword or a key phrase extracted from the text PD5b (step S52). Furthermore, the control unit 150 can estimate a scale and an attribute of a crowd for each geographical region by summing up, over multiple pieces of positing data, the number of pieces of posting data and an attribute for each geographical region (step S53).

In the fifth example, the control unit 150 may further determine that an event occurs in a geographical region corresponding to the posting data PD5, on the basis of the keyword or the key phrase extracted from the text PD5b (step S54a). For example, the control unit 150 may determine from a key phrase, "witnessing a traffic accident," that an event, "traffic accident," occurs. The control unit 150 may also determine, on the basis of the image PD5c, that an event occurs in a geographical region corresponding to the posting data PD5 (step S54b). For example, if a cherry blossom is shown in the image PD5c, the control unit 150 may determine that the event, "flowering of cherry blossoms," occurs.

Additionally, any combination of the various techniques for determining a simulation parameter, which have been described in the present section, may be accepted.

(2) Technique Based on Statistical Data

In the present embodiment, the control unit 150 may further decide a simulation parameter on the basis of statistical data collected from the external server group 20. The statistical data used here is collected on the basis of geographical positions of one or more people.

Figure 12A:
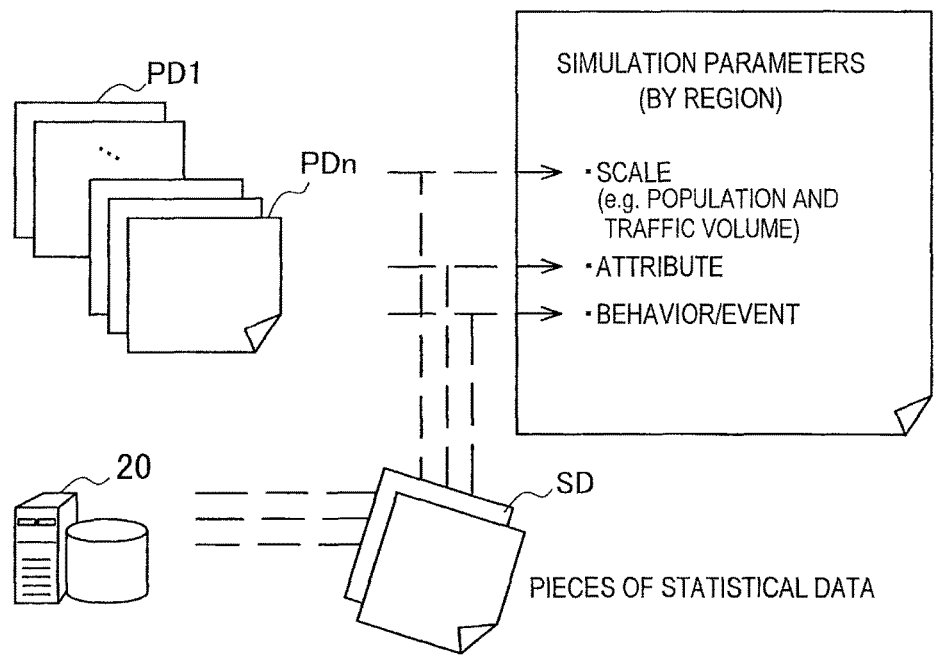
FIG. 12A is an explanatory diagram for describing a second technique for deciding a simulation parameter.

FIG. 12A is an explanatory diagram for describing a second technique for deciding a simulation parameter. With reference to FIG. 12A, statistical data SD collected from the external server group 20 is illustrated in addition to the pieces of posting data PD1 to PDn illustrated in FIG. 10. For example, the statistical data SD may be traffic data indicating congestion information. In this case, the control unit 150 may decide the number (scale) of vehicle models for each geographical region in accordance with a congestion level indicated by the traffic data. The statistical data SD may also be average income data indicating an average income by region. In this case, the control unit 150 may adopt an income value indicated by the average income data as a value for income (attribute) of a crowd for each geographical region. The statistical data SD may also be peace data indicating a crime rate by region. In this case, the control unit 150, for example, causes a character model to play specific behavior (such as the behavior, "smoking" illustrated in FIG. 8) in a geographical region in which a value for the crime rate indicated by the peace data is high. Alternatively, the control unit 150 may cause a specific event (such as travel of a patrol car) to occur.

(3) Use of Weather Data

In the present embodiment, the control unit 150 may change a background image included in a simulation image on the basis of weather data collected from the external server group 20. The weather data used here indicates the weather for each target region at the designated time (at the time of simulation or other time).

Figure 12B:
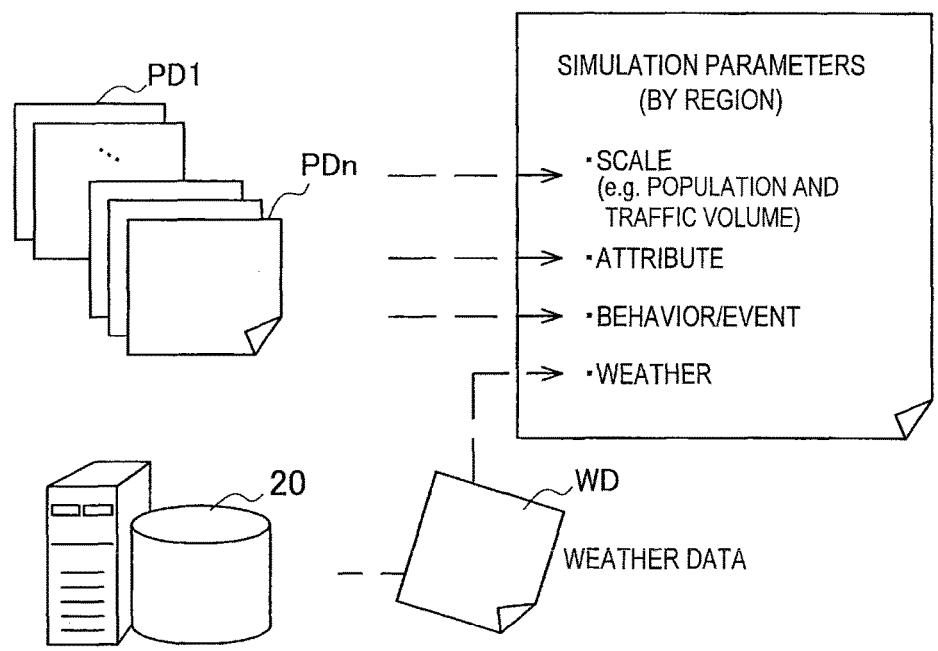
FIG. 12B is an explanatory diagram for describing a third technique for deciding a simulation parameter.

FIG. 12B is an explanatory diagram for describing a third technique for deciding a simulation parameter. With reference to FIG. 12B, weather data WD collected from the external server group 20 is illustrated in addition to the pieces of posting data PD1 to PDn illustrated in FIG. 10. The control unit 150 outputs the weather in a target region, which is indicated by the weather data WD, to the simulation unit 120 as a simulation parameter, and changes the weather represented by the background image of a simulation image. Additionally, the control unit 150 may output even designated time (or a time zone (such as morning, day, evening, and night)) to the simulation unit 120 as a simulation parameter, and change the time zone represented by the background image of the simulation image.

Figure 13A:
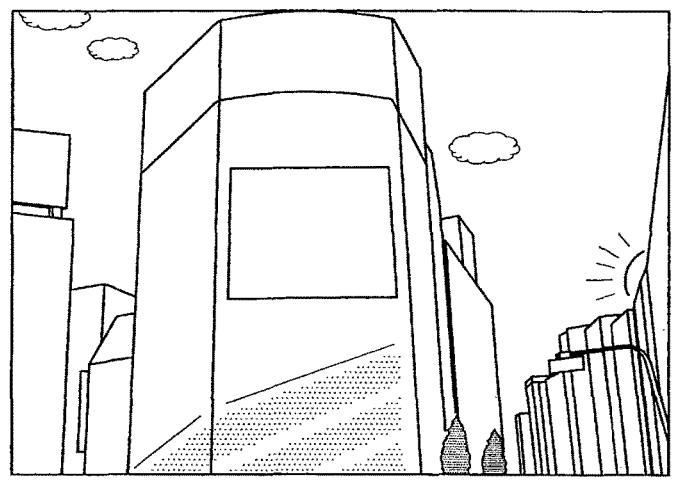
FIG. 13A is a first explanatory diagram for describing a background image that changes in accordance with weather and a time zone.
Figure 13B:
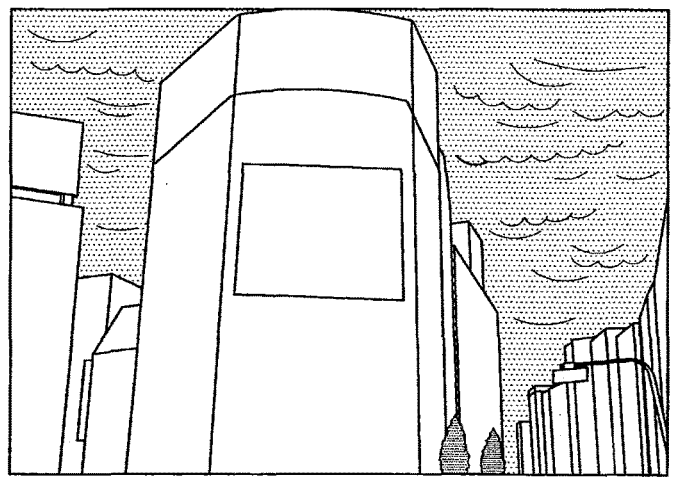
FIG. 13B is a second explanatory diagram for describing a background image that changes in accordance with weather and a time zone.
Figure 13C:
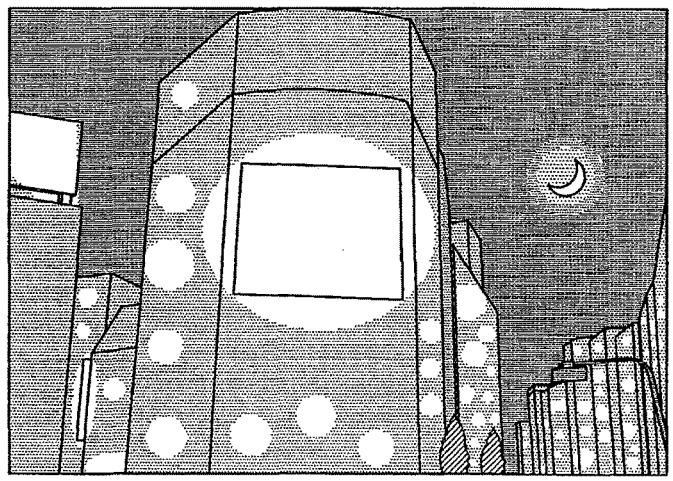
FIG. 13C is a third explanatory diagram for describing a background image that changes in accordance with weather and a time zone.

FIGS. 13A to 13C are each an explanatory diagram for describing a background image that changes in accordance with weather and a time zone. The figures illustrate background images showing the same views in the same target regions. However, the weather in FIG. 13A is "fine," and the time zone is "morning." The weather in FIG. 13B is "cloudy," and the time zone is "day." The weather in FIG. 13C is "fine," and the time zone is "night." Reality of a simulation result is enhanced by changing a background image of a simulation image in accordance with weather and a time zone in this way.

(2-5. Example of User Interface)

The present section will describe an example of a user interface that may be provided by the information processing apparatus 100.

Figure 14:
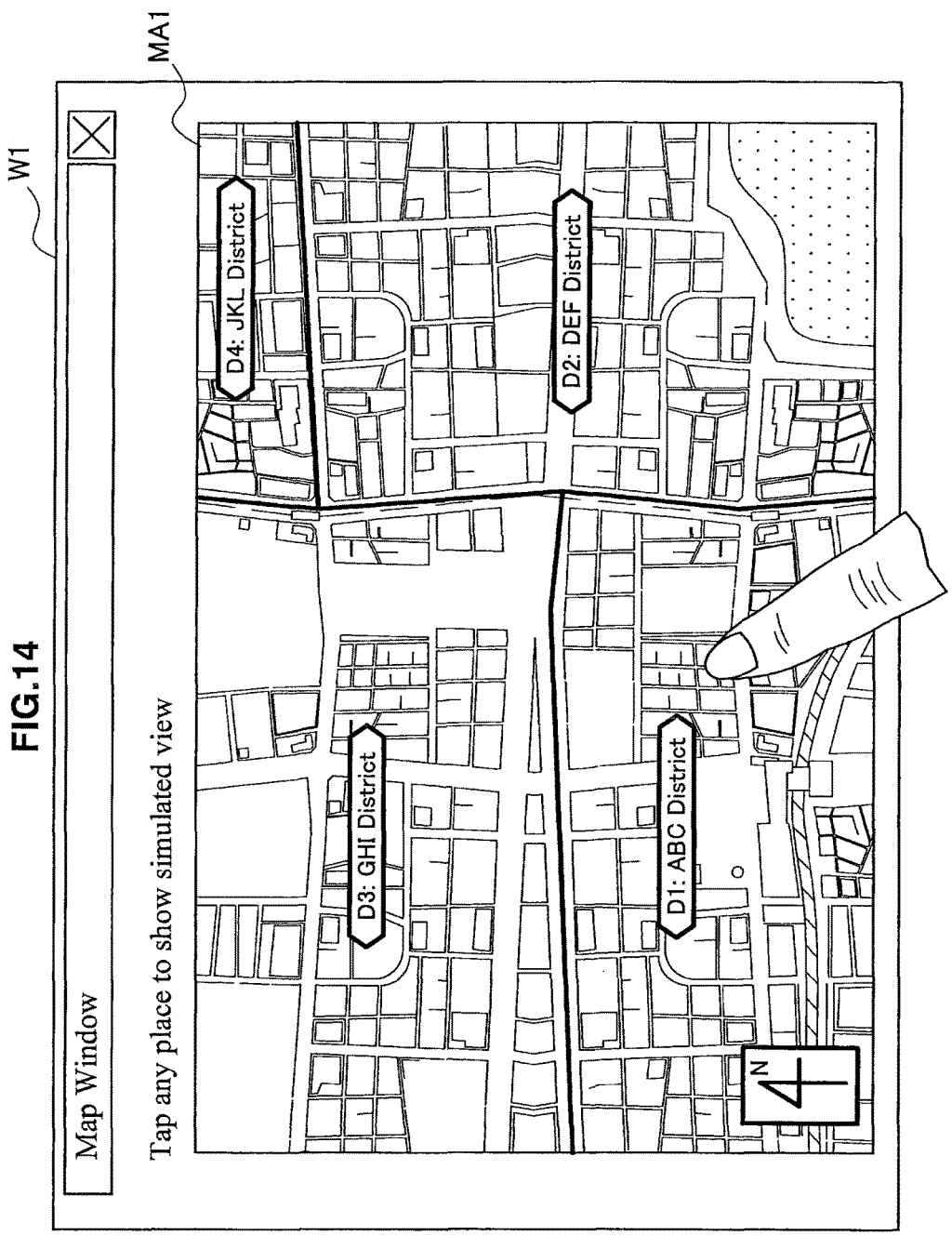
FIG. 14 is an explanatory diagram for describing an example of a region designation window.

FIG. 14 illustrates an example of a region designation window W1 that may be generated by the user interface unit 170 and displayed by the terminal apparatus 30. The region designation window W1 allows a user to designate a target region. In the example of FIG. 14, the region designation window W1 includes a map area MA1. The map area MA1 partially displays the real world model RM1. A user can designate a desired region displayed on the map area MA1 with an operation such as clicking or tapping. The user interface unit 170 may cause the display of the map area MA1 to be scrolled, or magnified or shrunk in accordance with detection of an operation such as dragging, pinching out, and pinching in. For example, once the region D1 is designated as a target region, a screen changes to a window that shows a simulation image.

Figure 15:
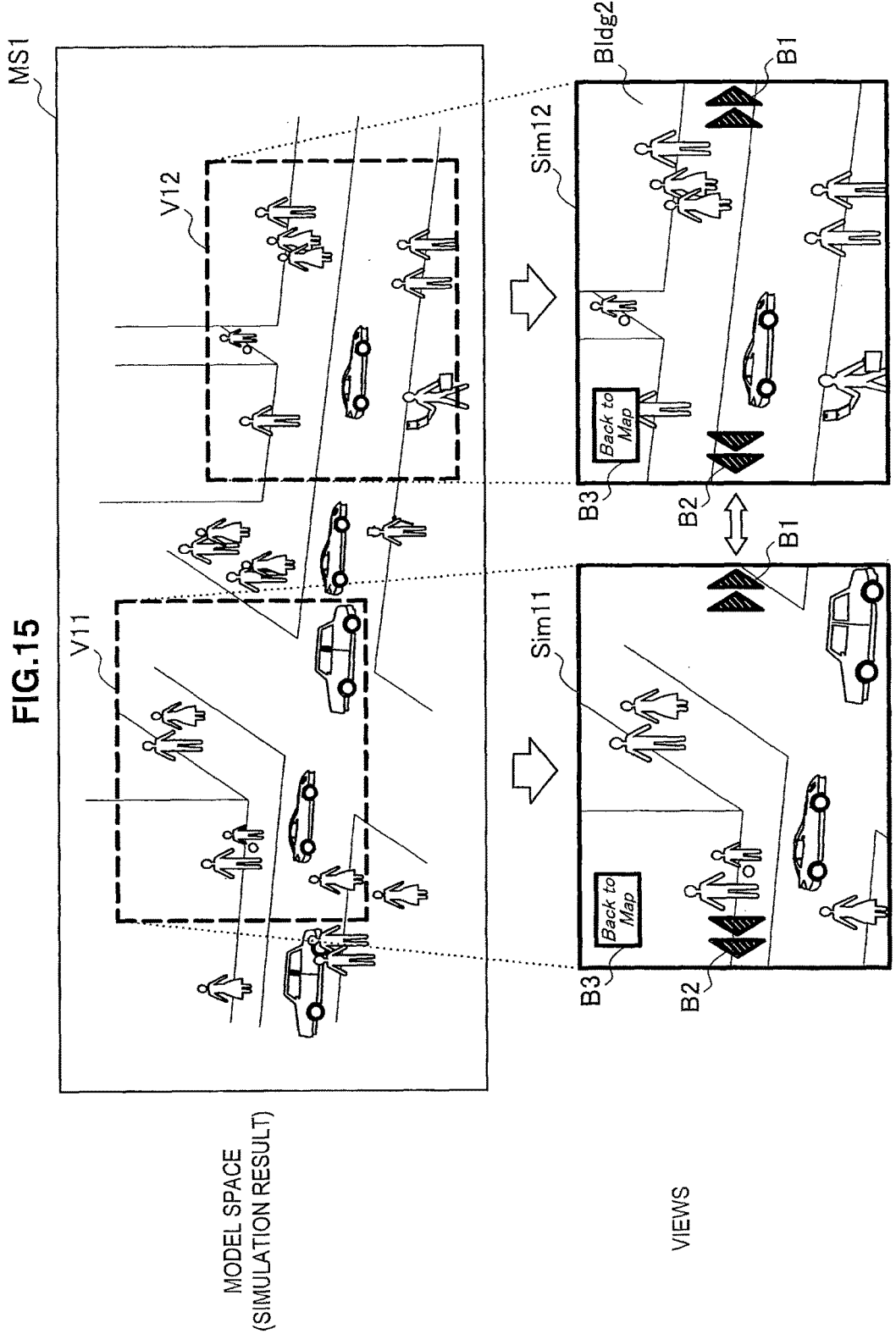
FIG. 15 is an explanatory diagram for describing a simulation image corresponding to a partial view of a simulation result.

FIG. 15 is an explanatory diagram for describing a simulation image corresponding to a partial view of a simulation result. The upper portion of FIG. 15 illustrates a model space MS1 as a simulation result. The model space MS1 virtually represents a space in a target region. A lot of character models and vehicle models included in a crowd are arranged in the model space MS 1. The arranged character models and vehicle models may move in the model space MS1 in accordance with predetermined algorithm (in a simpler embodiment, the models do not have to move).

In the present embodiment, a simulation image is a view from a viewpoint that is set in a model space. With reference to FIG. 15, a view V11 from a first viewpoint and a view V12 from a second viewpoint that are set in the model space MS1 are illustrated. A simulation image Sim11 corresponding to the view V11 includes five character models and two vehicle models at the illustrated moment. A simulation image Sim12 corresponding to the view V12 includes eight character models and one vehicle model at the illustrated moment. The character models are forming a line in front of a building Bldg2 in the simulation image Sim12. For example, a user can switches the views by operating GUI objects B1 and B2, which are superimposed on the simulation image. A user can also return to the region designation window W1 by operating a GUI object B3. Once a user is provided with such user interfaces, the user can freely move the visual line and enjoy situations of various geographical regions that change with the lapse of time as well as static landscapes of the city and the crowd in action in the city.

A simulation image of each view may be generated by superimposing a crowd image on a background image of a target region. The background image may be dynamically generated from the real world model by using the computer graphics (CG) technology. Alternatively, the background image may also be selected from multiple images (shot images or CG images) that may be stored in advance by the model DB 130. Instead, a shot image from a fixed point camera that may be arranged in the real world may be used as a background image. In a simpler embodiment, for example, a crowd image generated as a simulation result may be superimposed on a fixed background image to which a name of a target region is simply labeled.

In the present embodiment, posting data of the information transmission service is utilized as position associated data in order to decide a simulation parameter. However, as clarified from what has been described above, information at a poster level, which may include privacy, once aggregates macroscopic information at a geographical region level. Next, a scale of a crowd, and microscopic attributes and behavior of individual elements included in the crowd are simulated on the basis of the macroscopic information at the geographical region level. Thus, it is possible to protect privacy of a poster, and appropriately reflect a situation of a city that changes with the lapse of time to a simulation result, by using posting data responsive to a change in the real world.

(2-6. Flow of Processes)

Figure 16:
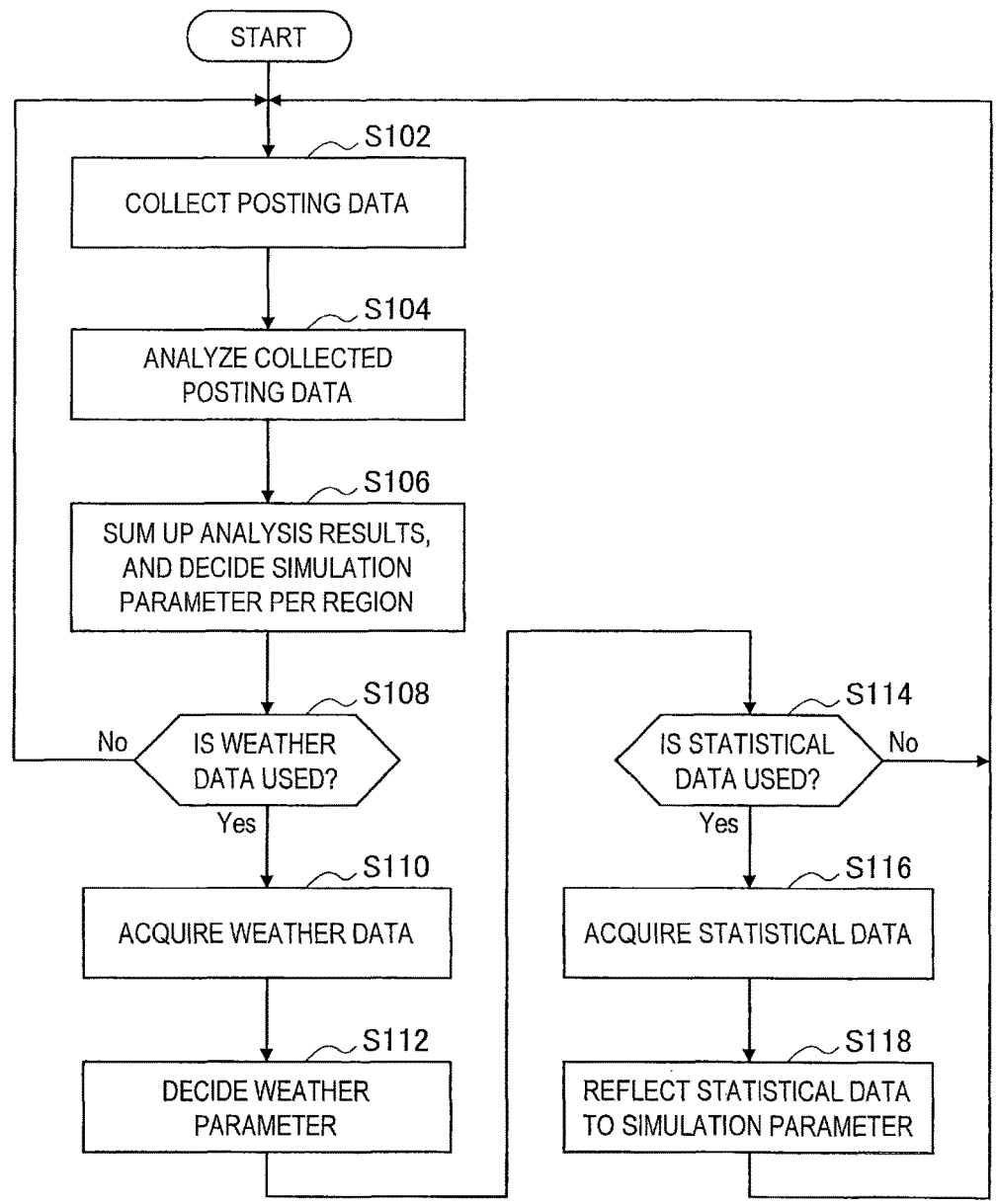
FIG. 16 is a flowchart illustrating an example of a flow of data collection processes that may be performed by an information processing apparatus according to an embodiment.
Figure 17:
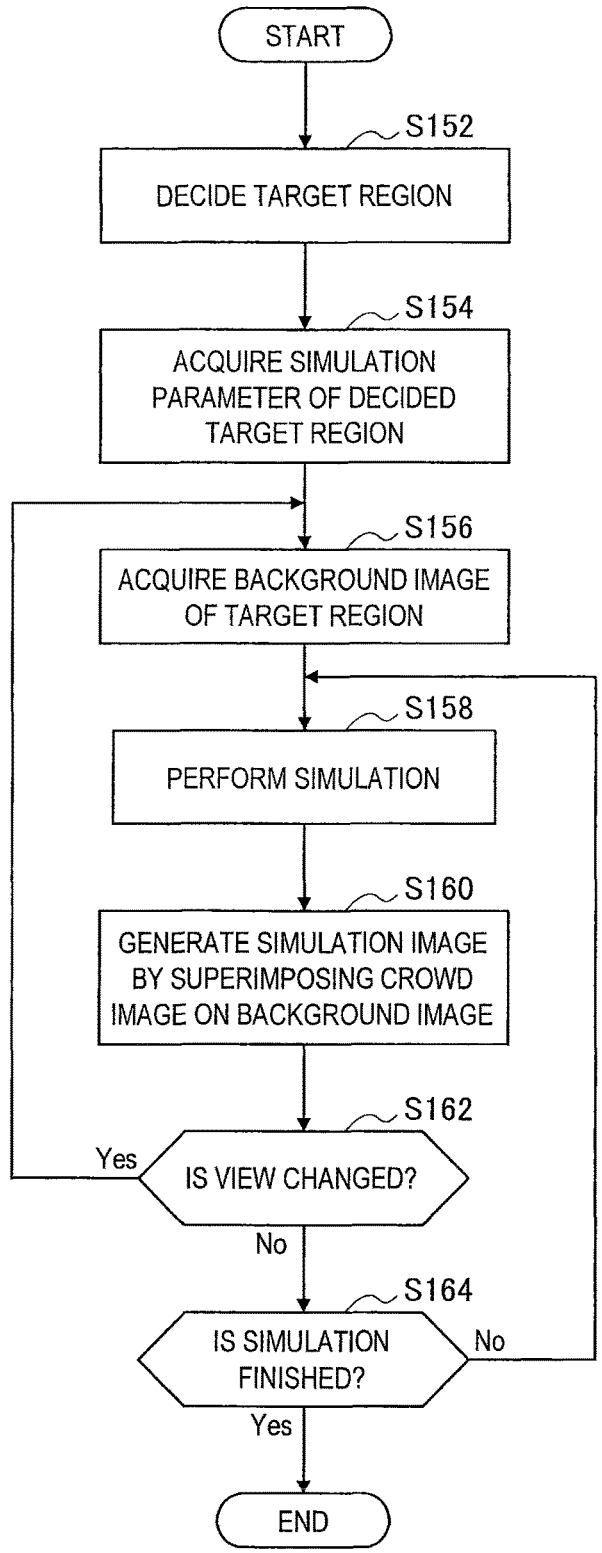
FIG. 17 is a flowchart illustrating an example of a flow of simulation processes that may be performed by an information processing apparatus according to an embodiment.

By using FIGS. 16 and 17, the present section will describe a flow of processes that may be performed by the information processing apparatus 100.

(1) Data Collection Processes

FIG. 16 is a flowchart illustrating an example of a flow of data collection processes that may be performed by the information processing apparatus 100. The data collection processes illustrated in FIG. 16 may be periodically repeated in fixed time frames.

First, the data collection unit 140 collects posting data from the data server 10 (step S102). The data collection unit 140 outputs the collected posting data to the control unit 150.

Next, the control unit 150 analyzes the posting data collected by the data collection unit 140 (step S104). Any combination of the techniques described by using FIGS. 11A to 11E may be used for the analysis of posting data. For example, the control unit 150 uses position data uploaded along with posting data, or analyzes text or an image included in the posting data to determine a geographical position (and a geographical region including the position) corresponding to the posting data. The control unit 150 also determines an attribute of the poster by using the text, the image, or user identification information included in the posting data.

Subsequently, the control unit 150 sums up the analysis result for each geographical region that is set in the real world to decide a simulation parameter (step S106). For example, the control unit 150 estimates the number of people corresponding to each geographical region from the number of pieces of posting data in each geographical region, and decides a scale of a crowd in each geographical region in accordance with the estimated number of people. For example, the control unit 150 also estimates attributes of people corresponding to each geographical region from the summing result of poster attributes with respect to each geographical region, and decides an attribute of a crowd in each geographical region in accordance with the estimated attributes. The control unit 150 may further model behavior of people corresponding to each geographical region on the basis of the analysis result of the posting data. The control unit 150 may also determine an event that occurs or an event that is predicted to occur in each geographical region, on the basis of the analysis result of the posing data. The control unit 150 causes the parameter DB 160 to store a simulation parameter that is decided for each geographical region.

Next, the data collection unit 140 determines whether to use weather data (step S108). When a background image is not changed in simulation in accordance with weather, weather data does not have to be used. A cycle of collecting weather data may be longer than a cycle of collecting posting data. When using weather data, the data collection unit 140 acquires weather data from the external server group 20 (step S110). The control unit 150 decides a weather parameter in each geographical region on the basis of the weather data collected by the data collection unit 140 (step S112).

Subsequently, the data collection unit 140 determines whether to use statistical data (step S114). When simulation is performed with only posting data, statistical data does not have to be used. A cycle of collecting statistical data may be longer than a cycle of collecting posting data. When using statistical data, the data collection unit 140 acquires statistical data from the external server group 20 (step S116). The control unit 150 reflects the statistical data collected by the data collection unit 140 to a simulation parameter in each geographical region (step S118).

(2) Simulation Processes

FIG. 17 is a flowchart illustrating an example of a flow of simulation processes that may be performed by the information processing apparatus 100. The simulation processes illustrated in FIG. 17 are started in response to detection of a user input (such as designation of a target region via the region designation window W1).

With reference to FIG. 17, first, the user interface unit 170 decides a target region of one or more geographical regions that are set in the real world (step S152). For example, the target region may be a region designated by a user on a map displayed on the screen of the terminal apparatus 30. Alternatively, the target region may also be a standard region that is registered in advance.

Next, the control unit 150 acquires a simulation parameter of the target region decided by the user interface unit 170 from the parameter DB 160 (step S154). The control unit 150 outputs the acquired simulation parameter of the target region to the simulation unit 120.

Subsequently, the simulation unit 120 acquires a background image of the target region (step S156). The background image acquired here may be different for each designated view, or be a fixed image that is independent of a view (or a region).

Next, the simulation unit 120 performs simulation with respect to a crowd present in the target region in accordance with the simulation parameter decided by the control unit 150 (step S158). The simulation unit 120 generates a simulation image by superimposing a crowd image of the simulated crowd on the background image (step S160). The simulation image generated here is transmitted from the information processing apparatus 100 to the terminal apparatus 30, and displayed by the terminal apparatus 30.

A GUI object used for a user to issue an instruction to switch views may be superimposed on the simulation image generated in step S160. Once the instruction to switch views is detected by the user interface unit 170, the processes return to step S156 (step S162), in which a background image in a new view may be acquired, and simulation may be performed again.

If views are not switched and the simulation is not finished, the processes return to step S158 (step S164), in which simulation may be continuously performed, and a simulation image on which a crowd moves in the same view may be displayed. Once an instruction to finish the simulation is detected, the simulation processes illustrated in FIG. 17 are finished.

(2-7. Configuration Example of Terminal)

As described above, the terminal apparatus 30 displays a simulation image that is output from the information processing apparatus 100 as a simulation result. The terminal apparatus 30 typically includes a communication I/F configured to establish communication connection to the information processing apparatus 100, an input device configured to receive a user input, a display device equipped with a screen, a memory configured to store a program and data, and a processor configured to operate a function of the terminal apparatus 30 by executing the program. The user interface (such as an UI for allowing a user to designate a target region) described by using FIGS. 14 and 15 may be realized by the input device and the display device of the terminal apparatus 30. The processor of the terminal apparatus 30 controls the user interface while communicating with the information processing apparatus 100, which may operate as a server. For example, the processor transmits information regarding a target region that may be designated by a user to the information processing apparatus 100 via the communication I/F, and causes the display device to display a simulation image received from the information processing apparatus 100 as a simulation result on the screen. Such a function of displaying a simulation image may be realized as an application function that operates on a terminal such as a PC and a smartphone.

(3. Modified Examples)

An example use of the technology according to one or more of embodiments of the present disclosure is an application that enables a user to experience a real atmosphere of a desired location by viewing a simulation image on a screen even if the user does not go there. For example, a user hangs the terminal apparatus 30, which displays a simulation image, on the wall of a house as a display. Accordingly, the user can enjoy such a special experience that a window on the wall was open forward a place in which the house does not actually exist. Different from an actual window, the views according to the above-described embodiment may be freely switched in accordance with an operation of a user.

As another use, the technology according to one or more of embodiments of the present disclosure may be used as a tool for communication between users. The present section will describe a modified example for such a use.

(3-1. Overview)

Figure 18:
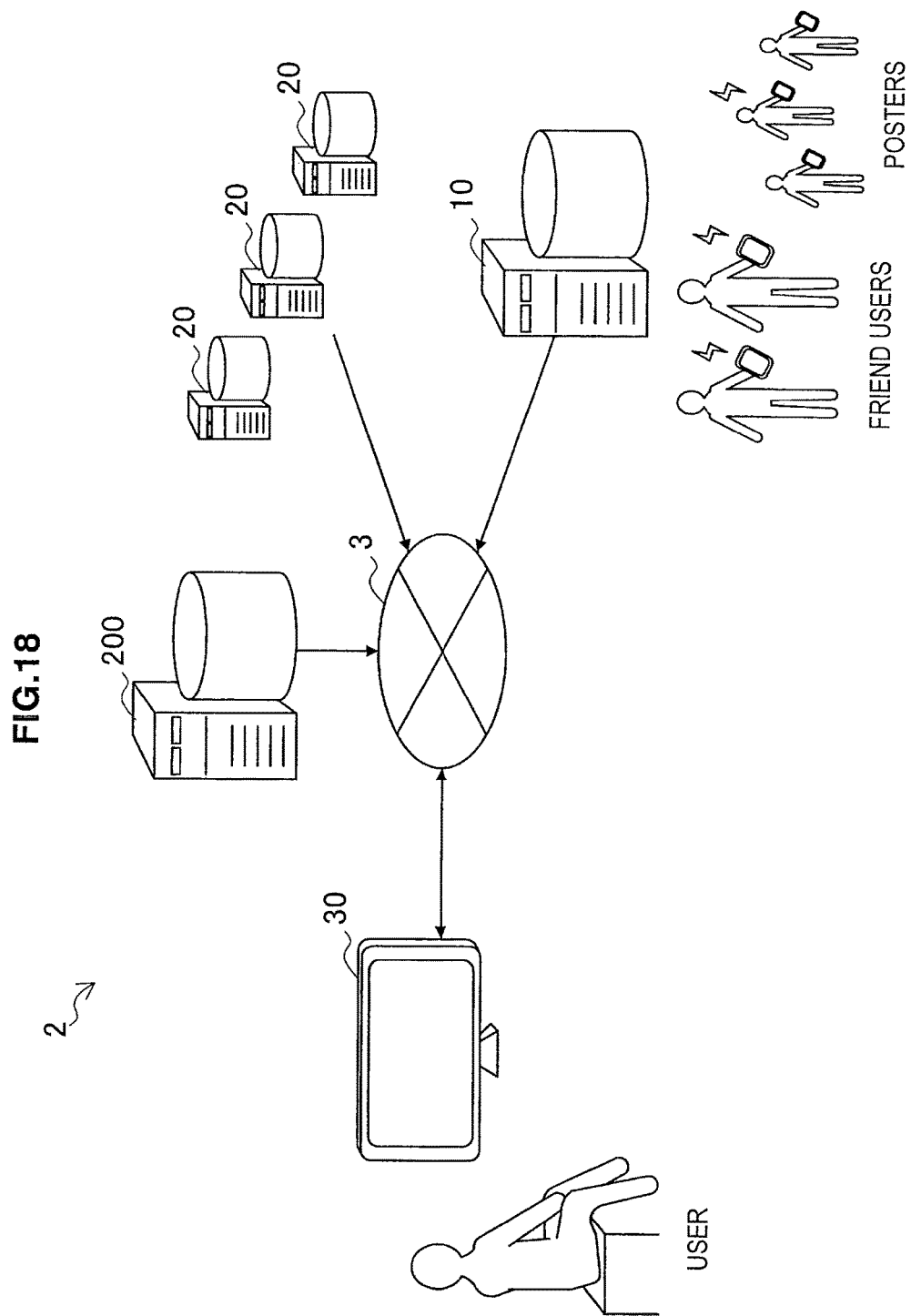
FIG. 18 is an explanatory diagram for describing an overview of an information processing system according to a modified example.

FIG. 18 is an explanatory diagram for describing an overview of an information processing system 2 according to a modified example. With reference to FIG. 18, the information processing system 2 includes an information processing apparatus 200.

As with the information processing apparatus 100, the information processing apparatus 200 performs simulation with respect to a crowd present in a target region in the real world. The simulation performed by the information processing apparatus 200 is used for virtually reproducing a situation of a city that may change with the lapse of time. A crowd may be represented by a collection of characters that may correspond to people in simulation. The number of characters, an attribute, and behavior are decided on the basis of position associated data that may be collected from the data server 10 and the external server group 20.

Furthermore, one or more friend users are defined in advance for each user in the present modified example. The information processing apparatus 200 collects position associated data transmitted from a terminal apparatus held by the friend user, and arranges an avatar for the friend user in a model space on the basis of the position associated data. An avatar for a user may also be arranged in the model space. Communication between users may be realized via the avatars displayed on a simulation image.

(3-2. Functional Configuration Example)

Figure 19:
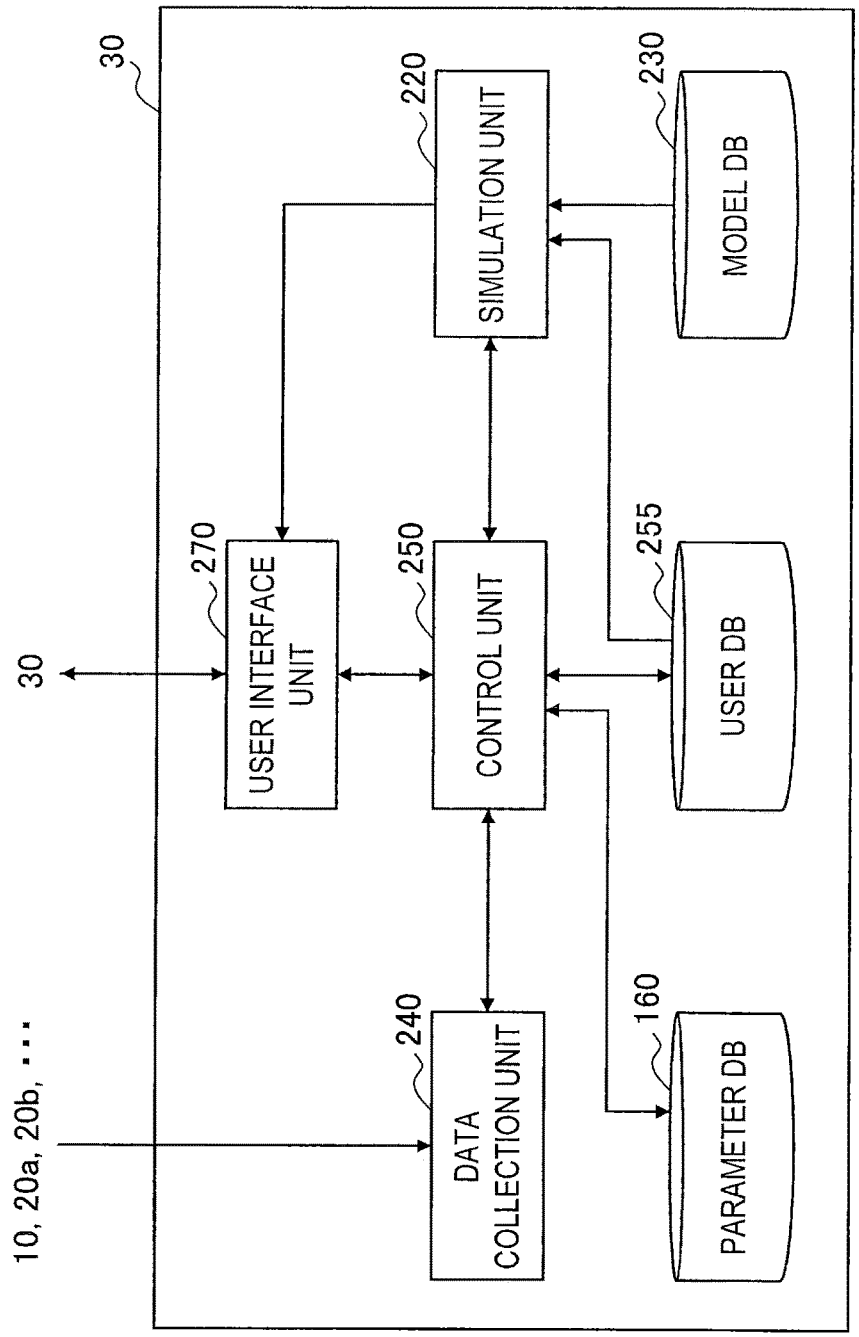
FIG. 19 is a block diagram illustrating an example of a logical functional configuration of an information processing apparatus according to a modified example.

A hardware configuration of the information processing apparatus 200 may be the same as the hardware configuration of the information processing apparatus 100 illustrated in FIG. 2. FIG. 19 is a block diagram illustrating an example of a logical functional configuration of the information processing apparatus 200. With reference to FIG. 19, the information processing apparatus 200 includes a simulation unit 220, a model DB 230, a data collection unit 240, a control unit 250, a user DB 255, a parameter DB 160, and a user interface unit 270.

(1) Simulation Unit

The simulation unit 220 performs simulation for reproducing a situation of a city in the real world. The simulation unit 220 generates a simulation image that may include a crowd image. The control unit 250 decides a scale, an attribute, and behavior of a crowd for each geographical region on the basis of the above-described position associated data. The simulation unit 220 generates a simulation image with respect to a target region designated by a user, and outputs the generated simulation image to the user interface unit 270.

If the position associated data indicates that the user's friend user is positioned in the target region designated by the user, the simulation unit 220 arranges an avatar for the friend user in a model space of the target region. The simulation unit 220 may decide a model space of which geographical region an avatar for each friend user is arranged in, by using the position associated data transmitted from a terminal apparatus held by a friend user in the real world. The simulation unit 220 may also arrange an avatar for a user (not a friend user but a main user) in a model space. A position of the avatar for the main user in the model space is typically independent of a position of the user in the real world. The position of the avatar may move in accordance with an operation of the user (or may be driven by AI and automatically move).

(2) Model DB

The model DB 220 stores, in advance, model data used when the simulation unit 220 performs simulation. The model data stored by the model DB 230 may include the above-described real world model, character model, and vehicle model. Furthermore, in the present modified example, the model data may include avatar models that are each defined in advance with respect to a user and a friend user.

Figure 20:
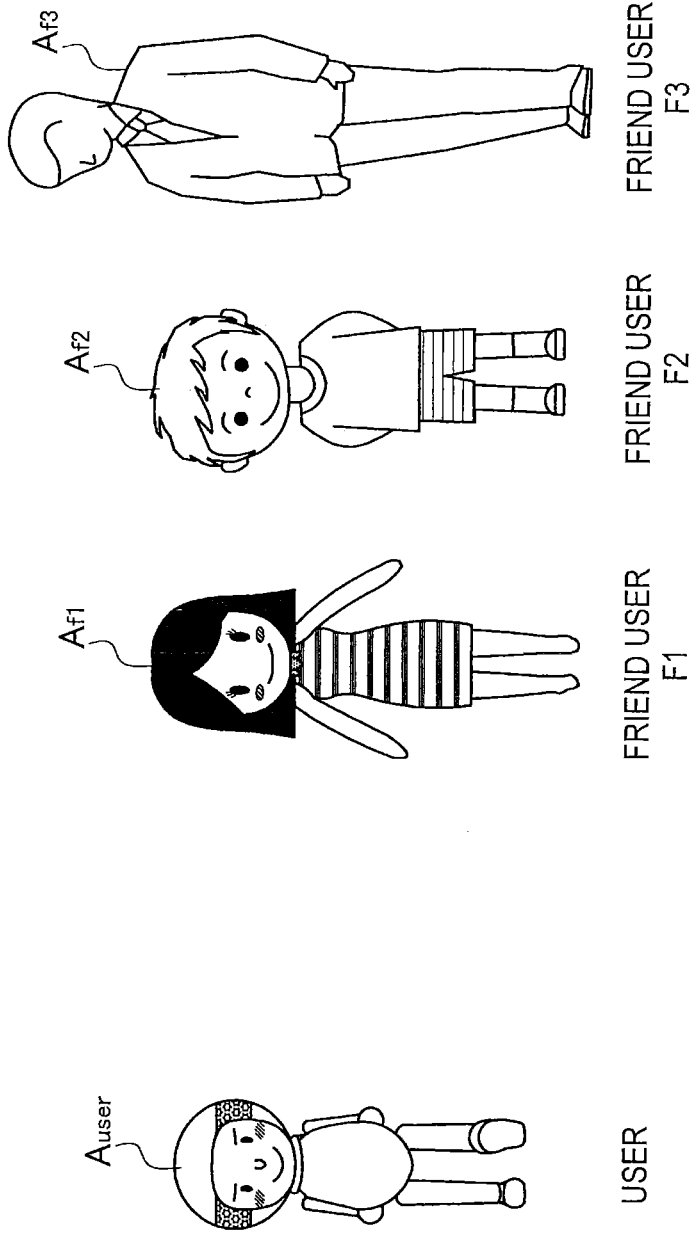
FIG. 20 is an explanatory diagram for describing examples of avatar models.

FIG. 20 illustrates four example avatar models $A_{User}$, $A_{f1}$, $A_{f2}$, and $A_{f3}$ that may be stored by the model DB 230. The avatar model $A_{User}$ is an avatar for a user who uses the terminal apparatus 30. The avatar models $A_{f1}$, $A_{f2}$, and $A_{f3}$ are avatars for friend users F1, F2, and F3, respectively.

(3) Data Collection Unit

The data collection unit 240 collects position associated data that is associated with geographical positions of one or more people. The position associated data may include posting data collected from the data server 10. A part of the pieces of posting data collected from the data server 10 is data uploaded from a terminal apparatus by a friend user as a poster. The position associated data may also include statistical data and weather data collected from the external server group 20.

(4) Control Unit

As with the control unit 150 of the information processing apparatus 100, the control unit 250 controls simulation that is performed by the simulation unit 220. For example, the control unit 250 decides a simulation parameter with respect to one or more geographical regions that are set in the real world, on the basis of the position associated data collected by the data collection unit 240. The simulation parameter decided by the control unit 250 may include a scale, an attribute, and behavior of a crowd for each geographical region. The control unit 250 inputs a simulation parameter corresponding to a target region designated via the user interface unit 270 to the simulation unit 220, and causes the simulation unit 220 to perform simulation with respect to the crowd present in the target region.

If the position associated data collected by the data collection unit 240 includes user identification information of a friend user, the control unit 250 determines a geographical position of the friend user by using position data that is uploaded along with the position associated data, or analyzing text or an image included in the position associated data. The control unit 250 inputs the determined geographical position to the simulation unit 220, and arranges an avatar for the friend user in a model space that is simulated.

(5) User DB

The user DB 255 stores user data that defines a relationship between users. The user data stored by the user DB 255 may include, for example, a list of identification information of friend users by user. The control unit 250 refers to the user data to determine which user is a friend user of which user.

(6) User Interface Unit

The user interface unit 270 provides a user interface for allowing a user to operate simulation performed in the information processing apparatus 200. For example, the user interface unit 270 causes the terminal apparatus 30 to display a GUI for allowing a user to designate a target region. The user interface unit 270 also causes the terminal apparatus 30 to display a simulation image generated by the simulation unit 220. The user interface unit 270 may superimpose a GUI object for switching views of a simulation image on the simulation image.

The user interface unit 270 provides a user interface that allows a user to designate an avatar for a friend user for communication between users in the present modified example. For example, when an avatar for a friend user displayed on a simulation image is designated by a user, the user interface unit 270 may activate a service for exchanging messages between the user and the friend user. Instead, when an avatar for a friend user displayed on a simulation image is designated by a user, the user interface unit 270 may display, on a window, text or an image of posting data posted by the friend user corresponding to the designated avatar. Meanwhile, when characters (other than avatars) for a crowd displayed on a simulation image are designated by a user, the user interface unit 270 may display, on the window, text or an image of posting data that may be randomly extracted, for example.

(3-3. Example of User Interface)

Figure 21:
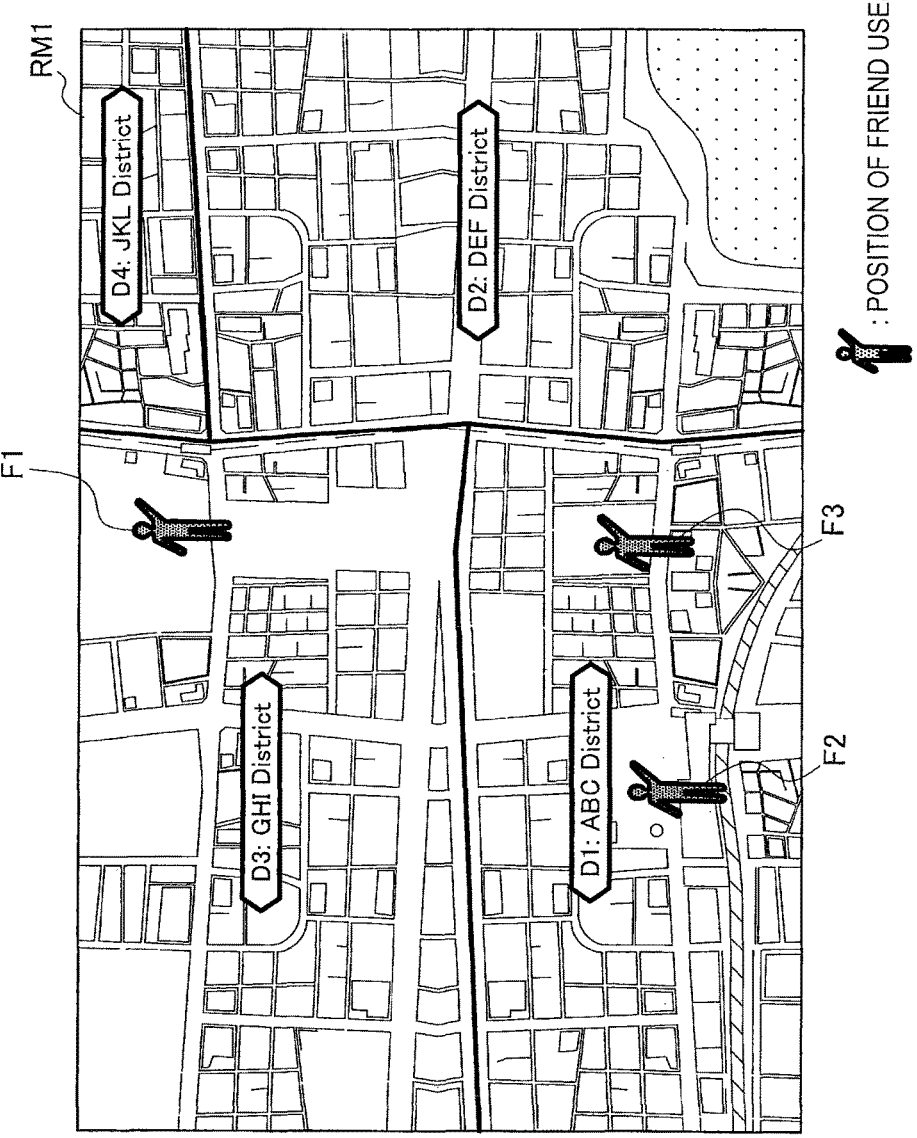
FIG. 21 is an explanatory diagram for describing position associated data that is collected from a terminal apparatus of a friend user.

FIG. 21 is an explanatory diagram for describing position associated data collected from a terminal apparatus of a friend user. With reference to FIG. 21, the real world model RM1 illustrated in FIG. 4 is illustrated again. The real world model RM1 has four geographical regions D1 to D4 set therein. Furthermore, in FIG. 21, icons indicating current positions of the friend users F1, F2, and F3 are plotted in the real world model RM1. For example, the friend user F1 is positioned in the region D3. The friend users F2 and F3 are positioned in the region D1. As described above, such geographical positions of the friend users may be determined by the control unit 250 with position associated data.

Figure 22:
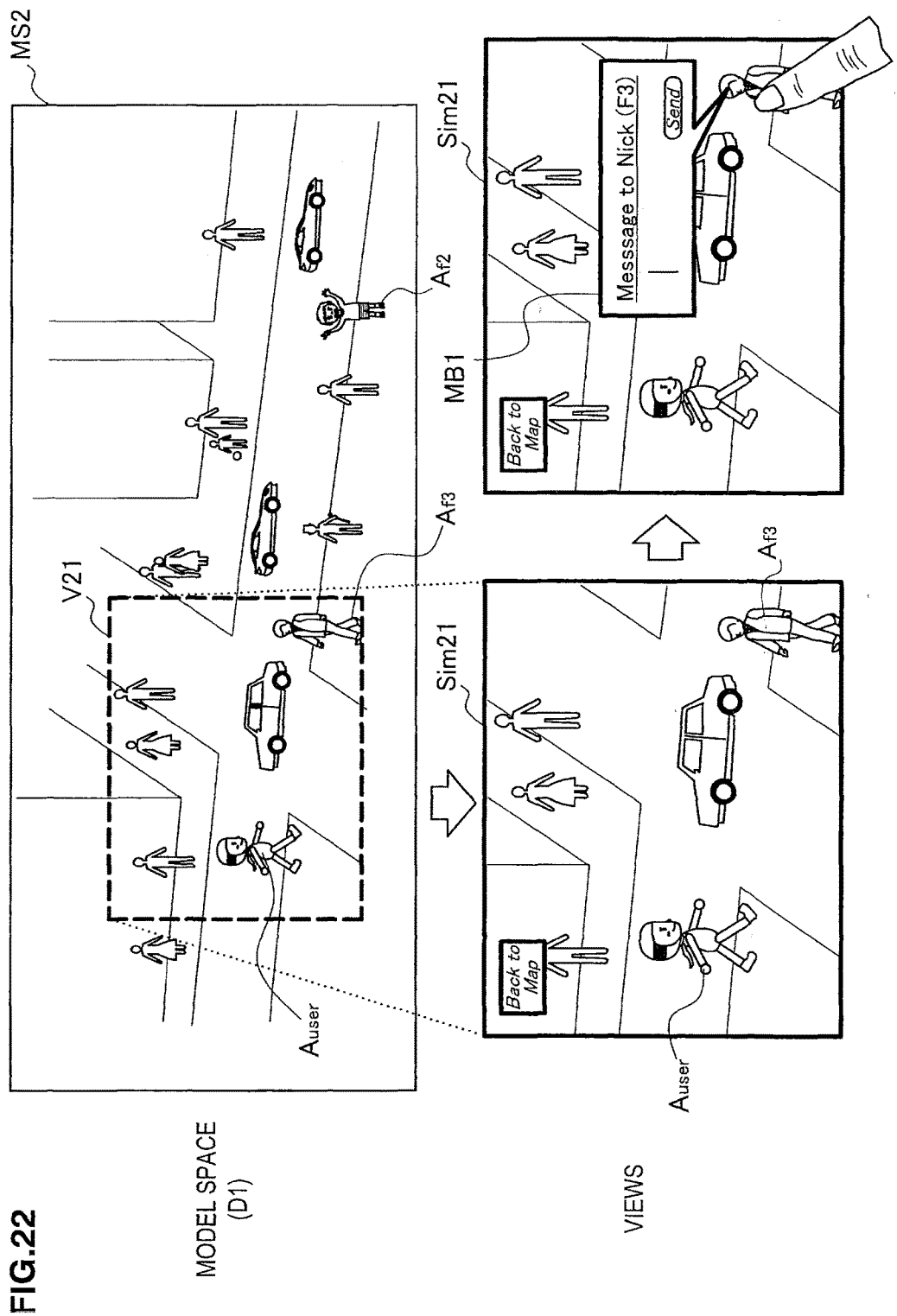
FIG. 22 is an explanatory diagram for describing an example of interaction via avatars.
Figure 23:
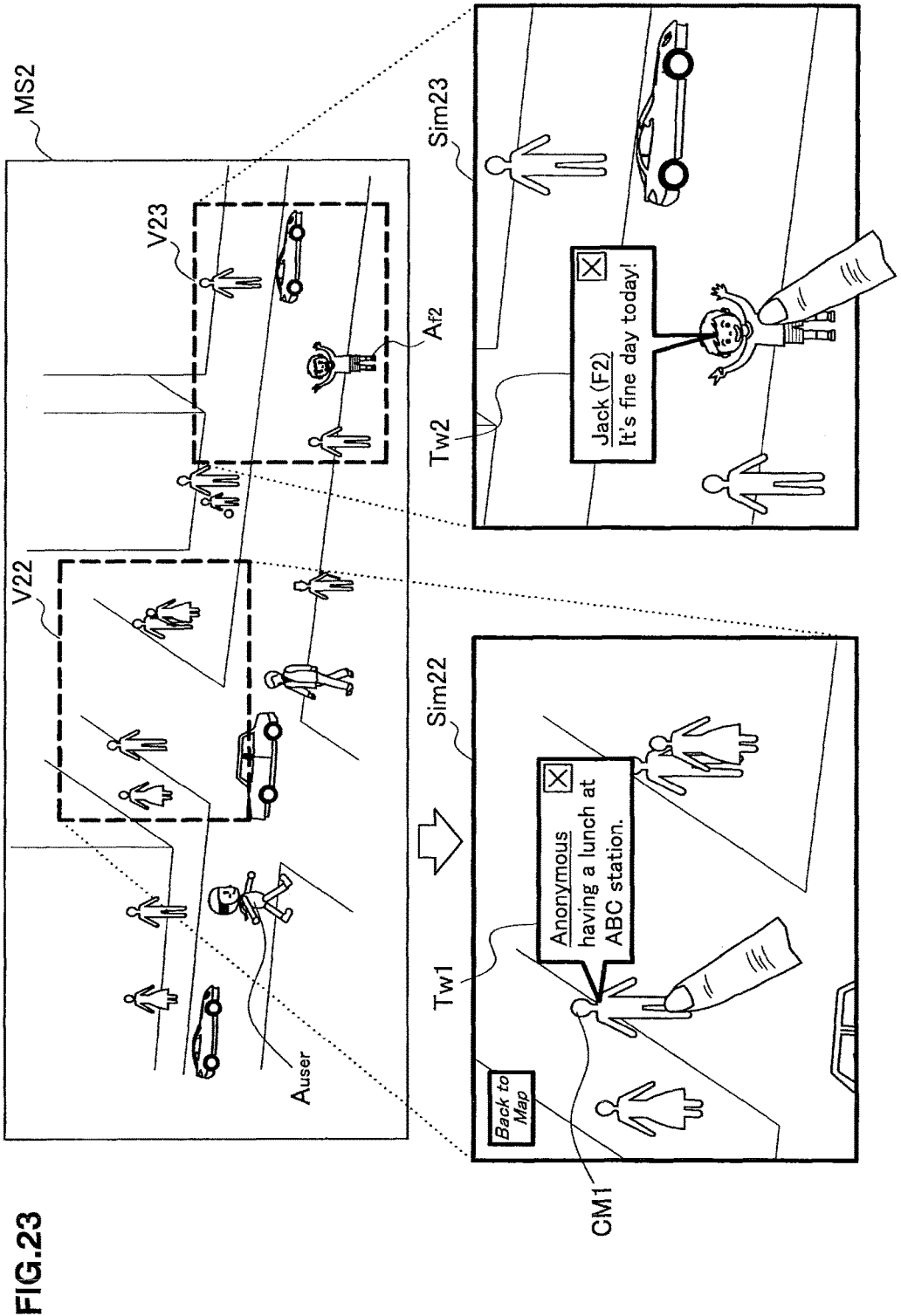
FIG. 23 is an explanatory diagram for describing another example of interaction via avatars.

FIGS. 22 and 23 are each an explanatory diagram for describing an example of interaction via avatars. With reference to FIG. 22, a model space MS2 as a simulation result is illustrated with the region D1 illustrated in FIG. 21 treated as a target region. The model space MS2 has a lot of character models and vehicle models included in a crowd arranged therein. The model space MS2 also has an avatar $A_{user}$ for a user, an avatar $A_{f2}$ for a friend user F2, and an avatar $A_{f3}$ for a friend user F3 arranged therein.

For example, a simulation image Sim21 corresponding to a view V21 from a first viewpoint that is set in the model space MS2 includes the avatar $A_{f3}$ for the friend user F3 at the illustrated moment (see the lower left portion of FIG. 22). Once the user taps the avatar $A_{f3}$, a service for exchanging messages is activated and a message input box MB1 for inputting a message that is transmitted to the friend user F3 is displayed (see the lower right portion of FIG. 22). Such interaction allows the user to view a simulation image that reproduces a real atmosphere of a desired location, and to seamlessly transmit a message to a friend who may be there.

With reference to FIG. 23, the model space MS2 as a simulation result is illustrated again with the region D1 treated as a target region. For example, a simulation image Sim22 corresponds to a view V22 from a second viewpoint that is set in the model space MS2. Once a user taps an anonymous character model CM1 in the simulation image Sim22, a text box Tw1 is displayed that includes text of posting data which is randomly extracted (see the lower left portion of FIG. 23). Meanwhile, a simulation image Sim23 corresponds to a view V23 from a third viewpoint that is set in the model space MS2. Once a user taps the avatar $A_{f2}$ for the friend user F2 in the simulation image Sim23, a text box Tw2 is displayed that includes text of the posting data posted by the friend user F2 (see the lower right portion of FIG. 23). While a user is viewing a simulation image that reproduces a real atmosphere of a desired location, such interaction allows the user to receive information transmitted from a friend who may be there.

(3-4. Further Modified Example)

The technology according to one or more of embodiment of the present disclosure may be applied to a game. For example, a virtual world for a role playing game or an adventure game may be constructed in simulation performed by the technology according to one or more of embodiments of the present disclosure. In addition to a simulated crowd, a game character who is a game facilitator may be arranged in the space. For example, if a user designates and speaks to a member of the crowd, text of posting data that is randomly extracted is replied from the designated character. Meanwhile, if a user designates and speaks to a game character, information useful in facilitating the game is replied. A background for an action game may be constructed in simulation that is performed in accordance with the technology according to one or more of embodiments of the present disclosure. Such application to games promotes a game world to integrate with the real world, and allows the reality of the game to be enhanced.

As described above, a situation of a city in the real world depends on a time zone, a day of the week, a season, or the like, and may change with the lapse of time. If simulation parameters accumulated in the parameter DB 160 regularly change (for example, periodically or linearly increase or decrease), it is possible to predict a simulation parameter at the future time from accumulated parameter values. Accordingly, in an embodiment, an UI may be provided that allows a user to designate a given time point on a time axis from the past to the future, and simulation may be performed for reproducing a situation of a city at the designated time point. The UI may be, for example, a calendar control for date selection, a list box for time zone selection, a slider associated with the time axis, or a combination thereof. Furthermore, an UI for stopping, fast forwarding, or rewinding the traveling time may be added. A user can hereby freely designate a desired time point, and visually grasp or enjoy not only a current situation of a target region, but also a past or future situation of the target region.

(4. Conclusion)

By using FIGS. 1 to 23, the embodiments according to the present disclosure have been described in detail. According to the above-described embodiments, simulation that is performed with respect to a crowd present in a target region in the real world is controlled on the basis of position associated data that is associated with geographical positions of one or more people, which is dynamically collected.

Thus, it is possible to appropriately reproduce a situation of the target region in the real world that may change with the lapse of time in simulation.

For example, a simulation image of a sightseeing area to which a lot of people come on a holiday may reproduce a situation in which the sightseeing area is full with a crowd on a holiday and is vacant on a weekday. For example, a simulation image of a downtown on a day on which a sale is held for females may reproduce a situation in which more female characters gather. Furthermore, for example, a simulation image of a business city may reproduce a situation in which a character behaves like a business man especially during the rush hours on a weekday.

According to the above-described embodiments, posting data uploaded in a user posting type information transmission service may be collected as at least a part of position associated data. In the user posting type information transmission service, an actual action or event is posted in most cases in real time or with only a few time lags. Thus, it is possible to track, with few time lags, a situation of a city that may change with the lapse of time, by using such responsiveness of the user posting type information transmission service.

When position data uploaded along with posting data is available, it is possible to easily sum up the number of posters and attributes of the posters for each region on the basis of a position indicated by the position data. Even when position data is not uploaded along with posting data, it is possible to determine an associated geographical position by analyzing the posting data and sum up the number of posters and attributes of the posters for each region. Information at a poster level, which may include privacy, aggregates macroscopic information at a geographical region level, and is reflected to simulation. Consequently, it is possible to protect privacy, and have a simulation result to quickly follow a change in the real world by using posting data of the user posting type information transmission service.

In the analysis example of posting data, although a lot of people do not actually gather in a geographical region, a scale of a crowd that is simulated may grow when the geographical region is paid attention in the information transmission service. In this case, it is possible to visualize, in a simulation result, a situation in which the region is potentially paid attention in a community on a network, rather than a situation that is visually recognized from video of the region shot in the real world.

Additionally, as position associated data, position data of a mobile terminal that is output from a GPS module or a wireless access point based positioning module may be used instead of (or addition to) posting data of the user posting type information transmission service. The position data of the mobile terminal may be provided, for example, through a communication service provider or a developer of a terminal operating system. In this case, for example, a scale of a crowd that is simulated may be decided depending on the number of terminals for each region that is summed up on the basis of the position data of the mobile terminal.

A series of processes performed by each apparatus described herein are typically realized using software. Programs included in the software that realizes the series of processes are stored in advance, for example, in a storage medium (non-transitory medium) that is provided inside or outside each apparatus. Each program is, for example, read into RAM upon execution, and executed by a processor such as a CPU.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1) An information processing apparatus including:
　　a simulation unit configured to perform simulation with respect to a crowd present in a target region in a real world, and to generate a simulation image that represents the crowd;
　　a data collection unit configured to collect position associated data that is associated with geographical positions of one or more people; and
　　a control unit configured to control the simulation based on the position associated data.

(2) The information processing apparatus according to (1), wherein the control unit controls a scale of the crowd in accordance with a number of the people corresponding to the target region, the number of the people being estimated based on the position associated data.

(3) The information processing apparatus according to (1) or (2), wherein the control unit controls an attribute of the crowd in accordance with attributes of the people corresponding to the target region, the attributes of the people being estimated based on the position associated data.

(4) The information processing apparatus according to any one of (1) to (3),
　　wherein the control unit models behavior of the people corresponding to the target region based on the position associated data, and
　　wherein the simulation unit causes the crowd to reproduce the behavior modeled by the control unit in the simulation.

(5) The information processing apparatus according to any one of (2) to (4), wherein the position associated data includes posting data that is uploaded along with position data in a user posting type information transmission service.

(6) The information processing apparatus according to any one of (2) to (4),
　　wherein the position associated data includes posting data that is uploaded in a user posting type information transmission service, and
　　wherein the control unit analyzes the collected posting data to determine a geographical position corresponding to the posting data.

(7) The information processing apparatus according to (3),
　　wherein the position associated data includes posting data that is uploaded in a user posting type information transmission service, and
　　wherein the control unit uses text, an image, or user identification information included in the posting data to estimate the attributes of the people corresponding to the target region.

(8) The information processing apparatus according to (4),
　　wherein the position associated data includes posting data that is uploaded in a user posting type information transmission service, and
　　wherein the control unit models the behavior of the people corresponding to the target region based on text, an image, or user identification information included in the posting data.

(9) The information processing apparatus according to any one of (1) to (8), wherein the data collection unit collects statistical data as at least a part of the position associated data, the statistical data being collected with respect to one or more people based on geographical positions.

(10) The information processing apparatus according to any one of (1) to (9), wherein the simulation unit generates the simulation image by superimposing a crowd image on a background image of the target region.

(11) The information processing apparatus according to (10),
wherein the data collection unit further acquires weather data indicating weather per target region, and
wherein the simulation unit changes weather represented by the background image based on the weather data acquired by the data collection unit.

(12) The information processing apparatus according to any one of (1) to (11),
wherein, in the simulation, the crowd is represented by one or both of a number of characters and a number of vehicles, the number of characters and the number of vehicles depending on a scale of the crowd,
wherein the simulation unit simulates motions of the characters or the vehicles, the characters and the vehicles being arranged in a model space obtained by modeling the target region, and
wherein the simulation image is a view from a viewpoint that is set in the model space.

(13) The information processing apparatus according to any one of (1) to (12),
wherein the control unit determines an event that occurs in the target region, or an event that is predicted to occur in the target region, based on the position associated data, and
wherein the simulation unit reproduces the event determined by the control unit in the simulation.

(14) The information processing apparatus according to any one of (1) to (13), further including:
a user interface unit configured to provide a user interface that allows a user to designate the target region.

(15) The information processing apparatus according to (1),
wherein the position associated data includes data transmitted from a terminal apparatus held by a specific user,
wherein, when the position associated data indicates that the specific user is positioned in the target region, the simulation unit further arranges an avatar for the specific user in a model space obtained by modeling the target region.

(16) The information processing apparatus according to (15), further including:
a user interface unit configured to, when a user designates the avatar that is displayed on the simulation image, activate a service for exchanging messages between the user and the specific user.

(17) The information processing apparatus according to (15),
wherein the position associated data includes posting data that is uploaded in a user posting type information transmission service, and
wherein the information processing apparatus further includes:
a user interface unit configured to display posting data that is uploaded by the specific user in the information transmission service, when the avatar that is displayed on the simulation image is designated.

(18) A terminal apparatus including:
a user interface unit configured to provide a user interface that allows a user to designate a target region in a real world; and
a control unit configured to transmit the designated target region to a server apparatus that performs simulation with respect to a crowd present in the target region based on position associated data which is associated with geographical positions of one or more people, to receive, as a result of the simulation, a simulation image that represents the crowd, and to display the simulation image on a screen.

(19) An information processing method executed by a terminal apparatus, the information processing method including:
providing a user interface that allows a user to designate a target region in a real world;
transmitting the designated target region to a server apparatus that performs simulation with respect to a crowd present in the target region based on position associated data which is associated with geographical positions of one or more people;
receiving, as a result of the simulation, a simulation image that represents the crowd; and
displaying the simulation image on a screen.

(20) A program for causing a computer that controls a terminal apparatus to function as:
a user interface unit configured to provide a user interface that allows a user to designate a target region in a real world; and
a control unit configured to transmit the designated target region to a server apparatus that performs simulation with respect to a crowd present in the target region based on position associated data which is associated with geographical positions of one or more people, to receive, as a result of the simulation, a simulation image that represents the crowd, and to display the simulation image on a screen.

What is claimed is:

1. An information processing apparatus, comprising:
at least one processor configured to:
simulate a crowd present in a target region in a real world;
generate a first image that represents the crowd, based on the simulation;
collect position associated data that is associated with a geographical position of at least one person present in the crowd; and
control the simulation based on the position associated data,
wherein the first image comprises a character model, of a plurality of character models, that represents the at least one person present in the crowd,
wherein an appearance of the character model, of the plurality of character models, is based on an attribute of the crowd, and
wherein the attribute of the crowd comprises an average income of the at least one person present in the crowd.

2. The information processing apparatus according to claim 1, wherein the at least one processor is further configured to control a scale of the crowd based on a number of people corresponding to the target region, and wherein the number of people is estimated based on the position associated data.

3. The information processing apparatus according to claim 1, wherein the at least one processor is further configured to control the attribute of the crowd based on an attribute of the at least one person, wherein the attribute of the at least one person comprises at least one of a sex or an age, and wherein the attribute of the crowd comprises at least one of an age composition ratio, a sex composition ratio, a peace level or an average income of people in the crowd.

4. The information processing apparatus according to claim 1, wherein the at least one processor is further configured to:

model a behavior of the at least one person corresponding to the target region based on the position associated data, and control the simulation based on the modeled behavior.

5. The information processing apparatus according to claim 2, wherein the position associated data includes posting data that is uploaded along with position data in a user posting type information transmission service.

6. The information processing apparatus according to claim 2, wherein the position associated data includes posting data that is uploaded in a user posting type information transmission service, and wherein the at least one processor is further configured to:

analyze the collected position associated data along with the posting data, and determine the geographical position corresponding to the posting data.

7. The information processing apparatus according to claim 1, wherein the position associated data includes posting data that is uploaded in a user posting type information transmission service, and wherein the at least one processor is further configured to estimate an attribute of the at least one person based on at least one of a text, a second image, or identification information included in the posting data.

8. The information processing apparatus according to claim 4, wherein the position associated data includes posting data that is uploaded in a user posting type information transmission service, and wherein the at least one processor is further configured to model the behavior of the at least one person corresponding to the target region based on a text, a second image, or identification information included in the posting data.

9. The information processing apparatus according to claim 1, wherein the at least one processor is further configured to collect statistical data, based on the geographical position, as a part of the position associated data, wherein the statistical data is collected with respect to the at least one person.

10. The information processing apparatus according to claim 1, wherein the at least one processor is further configured to generate the first image by superimposition of a crowd image on a background image of the target region.

11. The information processing apparatus according to claim 10, wherein the at least one processor is further configured to:

collect weather data that indicates weather associated with the target region, and change the background image based on the collected weather data.

12. The information processing apparatus according to claim 1, wherein, the crowd is represented in the first image by the plurality of character models and a plurality of vehicle models, wherein a number of character models in the plurality of character models and a number of vehicle models in the plurality of vehicle models depend on a scale of the crowd, wherein at least one processor is further configured to determine motions of the plurality of character models and the plurality of vehicle models, wherein the plurality of character models and the plurality of vehicle models are arranged in a model space related to the target region, and wherein the first image is a view from a viewpoint that is set in the model space.

13. The information processing apparatus according to claim 1, wherein the at least one processor is further configured to:

determine at least one of a first event that occurs in the target region or a second event that is predicted to occur in the target region, based on the position associated data, and control the simulation based on at least one of the determined first event or the determined second event.

14. The information processing apparatus according to claim 1, the at least one processor is further configured to generate a user interface that allows a first user to designate the target region.

15. The information processing apparatus according to claim 1, wherein the position associated data includes data transmitted from a terminal apparatus held by a first user, wherein, based on a determination that the position associated data indicates that the first user is positioned in the target region, the at least one processor is further configured to arrange an avatar for the first user in a model space related to the target region.

16. The information processing apparatus according to claim 15, wherein the at least one processor is further configured to, based on a determination that a second user designates the avatar that is displayed on the first image, activate a service to exchange messages between the first user and the second user.

17. The information processing apparatus according to claim 15, wherein the position associated data includes posting data that is uploaded in a user posting type information transmission service, and wherein the at least one processor is further configured to display the posting data that is uploaded by the first user in the user posting type information transmission service, based on a designation of the avatar that is displayed on the first image.

18. A terminal apparatus, comprising:

at least one processor configured to:

display a user interface that allows a user to designate a target region in a real world;

transmit information that indicate the designated target region to a server apparatus that simulates a crowd present in the target region, wherein the simulation is based on position associated data, wherein the position associated data is associated with a geographical position of at least one person present in the crowd;

receive, as a result of the simulation, an image that represents the crowd; and display the image on a screen,
wherein the image comprises a character model, of a plurality of character models, that represents the at least one person present in the crowd,
wherein an appearance of the character model, of the plurality of character models, is based on an attribute of the crowd, and
wherein the attribute of the crowd comprises an average income of the at least one person present in the crowd.

19. An information processing method, comprising:
designating a target region in a real world via a user interface, based on a user operation;
transmitting information indicating the designated target region to a server apparatus that simulates a crowd present in the target region, wherein the simulation is based on position associated data, wherein the position associated data is associated with a geographical position of at least one person present in the crowd;
receiving, as a result of the simulation, an image that represents the crowd; and
displaying the image on a screen,
wherein the image comprises a character model, of a plurality of character models, that represents the at least one person present in the crowd,
wherein an appearance of the character model, of the plurality of character models, is based on an attribute of the crowd, and
wherein the attribute of the crowd comprises an average income of the at least one person present in the crowd.

20. A non-transitory computer-readable medium having stored thereon computer-executable instructions that, when executed by a processor, cause a computer to execute operations, the operations comprising:
designating a target region in a real world via a user interface, based on a user operation;
transmitting information indicating the designated target region to a server apparatus that simulates a crowd present in the target region, wherein the simulation is based on position associated data, wherein the position associated data is associated with a geographical position of at least one person present in the crowd;
receiving, as a result of the simulation, an image that represents the crowd; and
displaying the image on a screen,
wherein the image comprises a character model, of a plurality of character models, that represents the at least one person present in the crowd,
wherein an appearance of the character model, of the plurality of character models, is based on an attribute of the crowd, and
wherein the attribute of the crowd comprises an average income of the at least one person present in the crowd.

* * * * *